(12) United States Patent
Maeda

(10) Patent No.: US 7,688,465 B2
(45) Date of Patent: Mar. 30, 2010

(54) PRINT INFORMATION IDENTIFICATION AND MANAGING APPARATUS WITH FIRST AND SECOND COUNTERS REPRESENTING HIGHER AND LOWER SIGNIFICANT BITS OF THE PRINT IDENTIFICATION INFORMATION

(75) Inventor: Masayuki Maeda, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1025 days.

(21) Appl. No.: 11/331,794

(22) Filed: Jan. 13, 2006

(65) Prior Publication Data

US 2006/0158687 A1    Jul. 20, 2006

(30) Foreign Application Priority Data

Jan. 19, 2005    (JP)    ............... 2005-011505

(51) Int. Cl.
*G06F 3/12*    (2006.01)
*H03K 21/00*    (2006.01)
(52) U.S. Cl. ........................................ 358/1.15; 377/44
(58) Field of Classification Search ....... 358/1.11–1.18; 377/37–46
See application file for complete search history.

(56) References Cited

U.S. PATENT DOCUMENTS

| | | | |
|---|---|---|---|
| 4,224,506 A * | 9/1980 | Coppola et al. ............... 377/32 |
| 5,570,201 A * | 10/1996 | Yokota ........................ 358/404 |
| 5,923,826 A * | 7/1999 | Grzenda et al. ............. 358/1.15 |
| 6,597,469 B1 * | 7/2003 | Kuroyanagi ................ 358/1.15 |
| 6,641,312 B1 * | 11/2003 | Chang et al. .................. 400/76 |
| 6,836,853 B1 * | 12/2004 | Dover et al. ................. 713/502 |
| 2005/0237555 A1 * | 10/2005 | Wildey et al. .............. 358/1.13 |
| 2006/0077474 A1 * | 4/2006 | Watanabe .................... 358/448 |

FOREIGN PATENT DOCUMENTS

JP    08320851 A    12/1996

* cited by examiner

*Primary Examiner*—Kimberly A Williams
(74) *Attorney, Agent, or Firm*—Panitch Schwarze Belisario & Nadel LLP

(57) ABSTRACT

An information managing apparatus assigns identification information to print information and manages the print information based on the identification information. A receiving section receives a plurality of items of data. A first counter is defined in a non-volatile first memory. A second counter is defined in a volatile second memory. An identification information producing section produces the identification information for each of the plurality of items of data based on a count of the first counter and a count of the second counter. An identification information managing section manages the plurality of items of data based on the identification information. The second counter counts up by a value every time the receiving section receives an item of data, and the first counter counts up when the image forming apparatus is turned on, and when the second counter overflows.

19 Claims, 21 Drawing Sheets

PRINT INFORMATION IDENTIFICATION AND MANAGING APPARATUS WITH FIRST AND SECOND COUNTERS REPRESENTING HIGHER AND LOWER SIGNIFICANT BITS OF THE PRINT IDENTIFICATION INFORMATION

BACKGROUND OF THE INVENTION

1. Field of the Invention

The present invention relates to an information managing apparatus that manages a plurality of jobs. More particularly the present invention relates to production and management of job information that identifies a job from among a plurality of jobs.

2. Description of the Related Art

Japanese Patent Laid-Open No. 8-320851 discloses a recent information communication network that includes a plurality of host apparatuses that share a terminal device such as a printer. The terminal device is provided with a function for reliably managing the print data received from one or more host apparatuses. For example, a network printer receives a plurality of items of print data from one or more host apparatuses over the network. For each item of print data received, the printer analyzes the item of print data to produce a print job that includes data in an intermediate format and attributes necessary for identifying the data. This print job is stored into a RAM (volatile) in the printer. The RAM usually stores a plurality of print jobs that are waiting for subsequent processing. The print jobs are assigned unique identification numbers by which a desired print job can be identified during the subsequent processing.

A print job includes an integer-storing area in which the identification number for the print job is stored. Identification numbers are generated in incremented manner such that each new print job has its unique identification number. Conventionally, the identification numbers are created on a RAM. Therefore, when electric power to the RAM is shut down, the identification numbers on the RAM are lost. When the printer is turned on again, new print jobs may be assigned the identification numbers that were used before the printer was turned off. As a result, when a host apparatus sends a request to refer the history of print jobs, more than one print job having the same identification numbers could be referred.

One way of solving the aforementioned drawbacks is to produce the identification number on a FLASH memory or an EEPROM. However, this way suffers from a problem that every time a print job is created, an integer-storing area on a FLASH memory or EEPROM must be referenced. Thus, this way is almost impractical. Moreover, the aforementioned conventional art assumes that a printer is allowed to produce as many of print jobs as the integer-storing area can hold the number of times of production of print jobs. If the number of times of production of print jobs exceeds the capacity of the integer-storing area, then more than one print job could have the same identification number.

SUMMARY OF THE INVENTION

An object of the invention is to provide an information managing apparatus in which the previously generated identification numbers are prevented from being generated.

Another object of the invention is to provide an information managing apparatus in which the identification numbers stored in the print jobs may be re-used and the number of times of updating a counter that counts the number of print jobs created.

Yet another object of the invention is to provide an information managing apparatus in which the counter has a minimum size initially and can then be increased in size as required.

Still another object of the invention is to provide an information managing apparatus in which the user is allowed to set a predetermined value to the beginning of the identification information of print jobs, for example, on a week-to-week basis or on a month-to-month basis.

An information managing apparatus assigns identification information to print information and manages the print information based on the identification information.

A receiving section receives a plurality of items of data. A first counter is defined in a non-volatile first memory. A second counter is defined in a volatile second memory. An identification information producing section produces the identification information for each of the plurality of items of data based on a count of the first counter and a count of the second counter. An identification information managing section manages the plurality of items of data based on the identification information.

The second counter counts up by a value every time the receiving section receives an item of data, and the first counter counts up when the image forming apparatus is turned on, and when the second counter overflows.

The identification information producing section combines the count of the first counter and the count of the second counter for producing the identification information. The count of the first counter and the count of the second counter are combined such that the count of the first counter represents higher digits and the count of the second counter represents lower digits.

The second memory includes a memory area that stores the count read from the first counter. The identification information producing section produces the identification information based on a count held in the memory area and the count of the second counter.

The information managing apparatus further includes a size extending section that monitors the count of the first counter. When the count of the first counter overflows, the size extending section increases the first counter in size.

The first counter is defined in a hard disk drive. The size extending section increases the first counter in size in accordance with a file system in the hard disk drive.

The information managing apparatus further includes a counter setting section that sets the desired value to the first counter.

The desired value is set to the first counter in response to an input information from an external device.

The information is received through an information inputting section provided in the information managing apparatus.

The information is transmitted from the external device.

The information managing apparatus further includes an identification information storing section and an identification acquiring section. The identification information storing section detects a part of identification information assigned to a first one of the plurality of items of data, and stores the part of identification information therein. The identification acquiring section assigns the part of identification data stored in the identification information storing section to a second one of the plurality of items of data.

The first item of data is non-printed data.

The first one of the plurality of items of data includes a status information storing area that stores a process status of the first one of the plurality of items of data. The identification information storing section detects the first one of the plurality of items of data based on the process status.

The information managing apparatus is a printer.

The information managing apparatus is a computing system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 3 is a flowchart illustrating the process performed shortly after the image forming apparatus is turned on;

FIG. 16 is a flowchart illustrating the operation of the image forming apparatus when the image forming apparatus is turned on;

DETAILED DESCRIPTION OF THE INVENTION

First Embodiment

{Construction}

Figure 1:
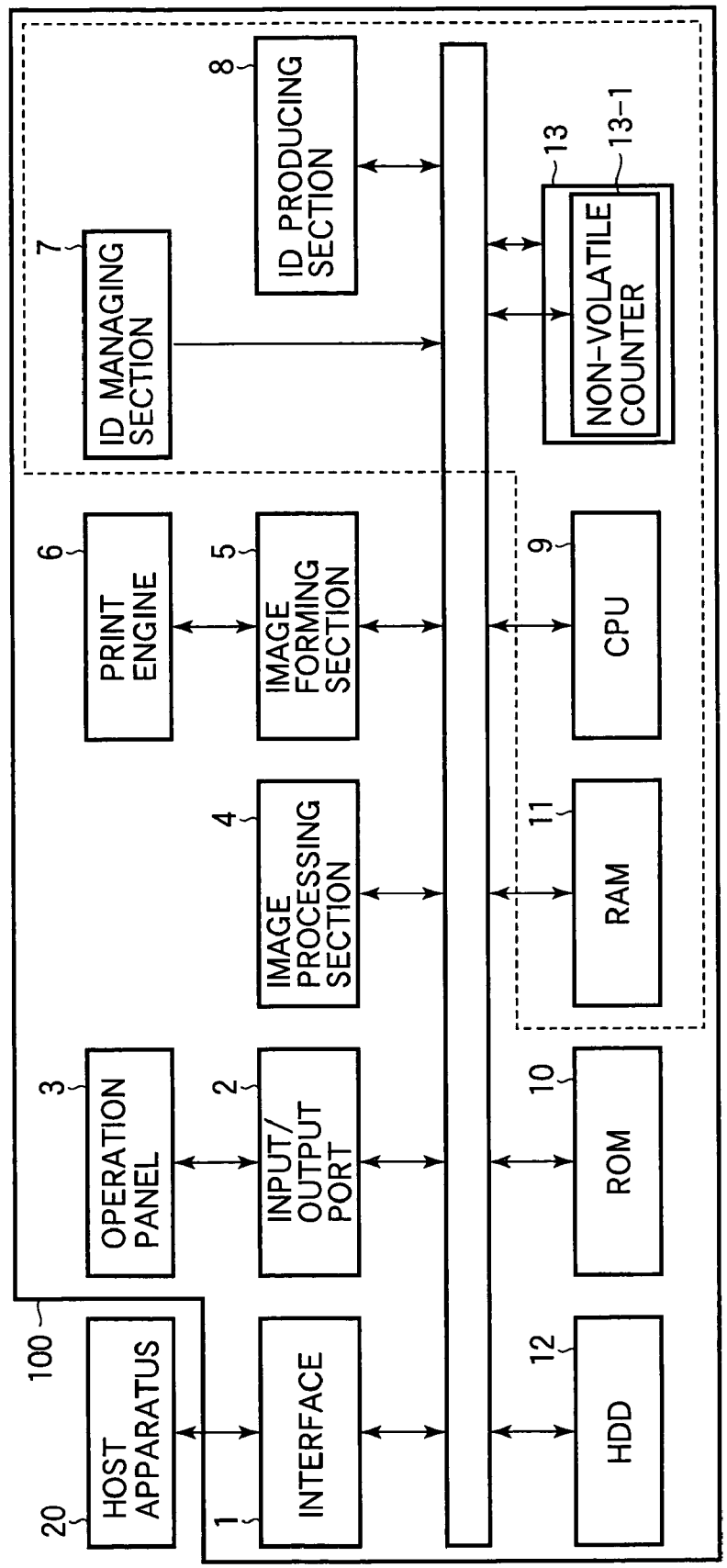
FIG. 1 is a block diagram illustrating an image forming apparatus 100 according to the invention.

FIG. 1 is a block diagram illustrating an image forming apparatus 100 according to the invention. Referring to FIG. 1, an interface 1 is located between the image forming apparatus 100 and a host apparatus 20. The interface 1 serves as a data link through which print data is transmitted and received. The interface 1 is on a network interface card that performs conversion from one protocol to another between the host apparatus 20 and the network.

An input/output port 2 serves as a man-machine interface between an operator and the image forming apparatus 100. The image forming apparatus 100 prompts the operator to input control information such as commands through the operating panel 3, and indicates to the operator the operation status of the image forming apparatus 100. The operator inputs the control information from an operation panel 3. The input/output port 2 is a computer based control means that is activated when a CPU 9 executes a program stored in an HDD 12 or a ROM 10.

The operation panel 3 includes an LCD and a keyboard through which the operator inputs the control information such as commands, and through which the image forming apparatus 100 indicates the operation status to the operator. An image processing section 4 analyzes the print data received through the interface 1 from the host apparatus 20, then converts the print data into bit-map data, and finally expands the print data in an area of a RAM 11. The image processing section 4 produces print job-identifying information, which in turn is stored into the print job. The image processing section 4 is a computer based means activated when the CPU 9 executes the program stored in the HDD 12 or ROM 10.

An image forming section 5 receives the bit map data, and controls a print engine 6 to form an image on a print medium and output the print medium. The image forming section 5 also indicates the operation status of the print engine 6 to the operator through the input/output port 2 and operation panel 3. The image forming section 5 is a computer based means activated when the CPU 9 executes the program. The print engine 6 is a printing mechanism that forms an image on the print medium under the control of the image forming section 5.

An ID managing section 7 takes the form of a program and manages a 10-bit non-volatile counter 13-1 defined in an area of a rewritable non-volatile memory 13. The non-volatile counter 13-1 counts up by one every time a 22-bit counter (i.e., lower area AL in FIG. 2) defined in an area of the RAM 11 overflows and every time the image forming apparatus 100 is turned on. The non-volatile counter 13-1 holds the upper 10 bits of the print job identification information.

A computer based ID producing section 8 produces 32-bit print job identifying information by using the count of an ID producing counter 11-3, which will be described later. Then, the ID producing section 8 stores the thus produced 32-bit print job identifying information into an ID number storing area 11-2 defined in a print job 11-1.

The CPU 9 is a microprocessor that performs the overall control of the image forming apparatus 100. The CPU 9 executes programs stored in the HDD 12 or the ROM 10 to activate the input/output port 2, image processing section 4, image forming section 5, and ID producing section 8.

The ROM 10 stores the program that performs the overall control of the image forming apparatus 100, and part of the control data. It is to be noted that the 22-bit counter for generating print job identification information is defined in the ROM 10.

The RAM 11 is a volatile memory, and provides an arithmetic operation area used when the CPU 9 executes the program stored in the ROM 10. In the first embodiment, the RAM 11 also includes the 22-bit counter used for producing the print job identification information when the print job is produced.

The HDD 12 is a hard disk drive, and holds information under the control of a host apparatus. The rewritable non-volatile memory 13 takes the form of a non-volatile memory such as a FLASH memory or an EEPROM. The aforementioned ID non-volatile counter 13-1 is defined in the rewritable non-volatile memory 13.

{Function of ID Managing Section and ID Producing Section}

A description will be given of the function of the ID managing section 7 and the ID producing section 8.

Figure 2:
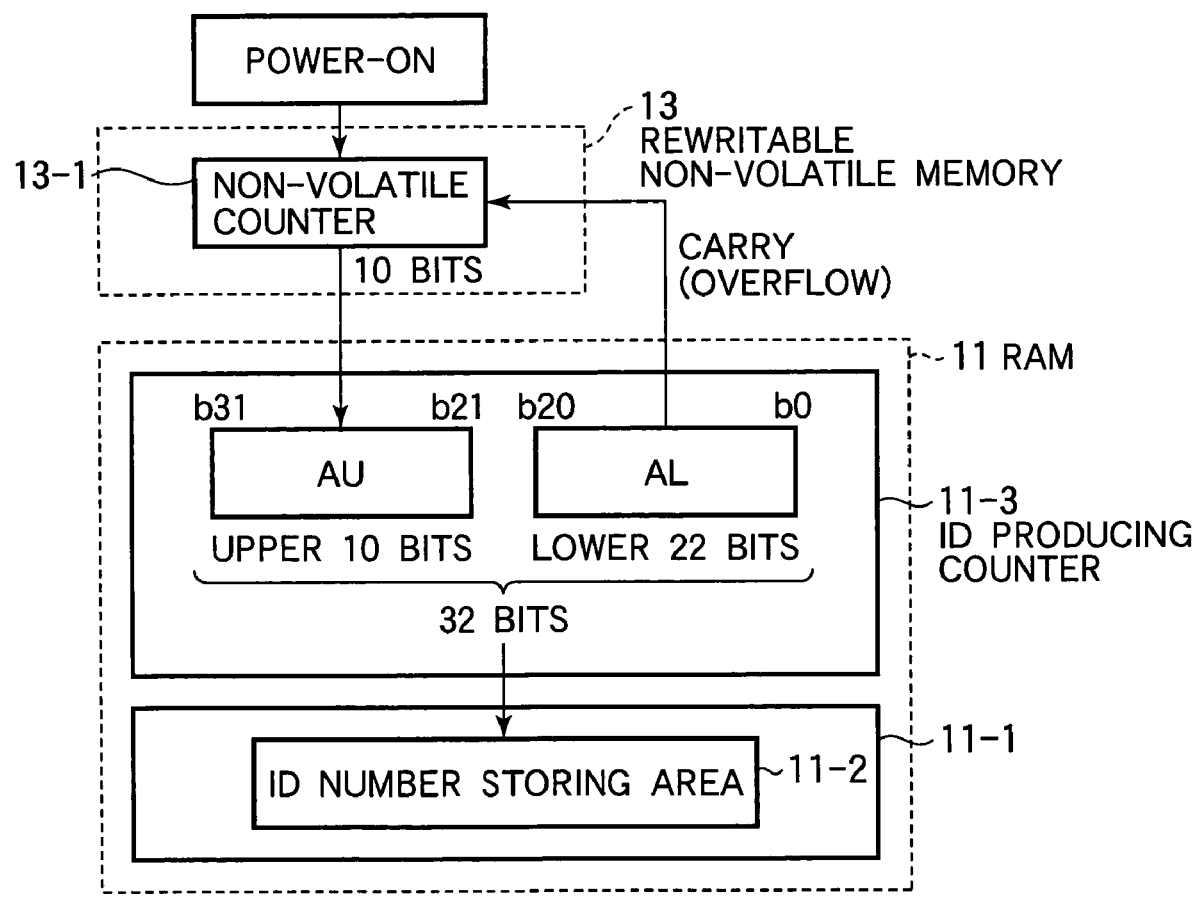
FIG. 2 illustrates the production and management of the identification information.

FIG. 2 illustrates the production and management of the identification information. When the image forming apparatus 100 (FIG. 1) has received print data, the production of a print job 11-1 is initiated in the RAM 11. The print job 11-1 has an ID number storing area 11-2 that stores the identification number of the print job. The ID producing counter 11-3 is a defined in the RAM 11. The rewritable non-volatile memory 13 includes the 10-bit non-volatile counter ID.

The ID producing counter 11-3 is a 32-bit counter that includes an upper area AU for upper 10 bits and a lower area AL for lower 22 bits. The upper area AU receives the count of the ID non-volatile counter 13-1 and therefore holds the same count as the non-volatile counter 13-1. The lower 22 bits represent the number of print jobs produced. When the image forming apparatus 100 is turned on, the area for the lower 22 bits is cleared, and then counts up by one every time a new print job is produced. When the lower bits of the counter overflow, all of the 22 bits are cleared and at the same time the non-volatile counter 13-1 counts up by one (i.e., carry) The value of the non-volatile counter 13-1 is then stored into the upper area AU of the ID producing counter 11-3. The count of the ID producing counter 11-3 is then stored into the ID number storing area 11-2 of the print job 11-1. Thus, there is no chance of two or more same identification numbers are used.

{Operation of Image Forming Apparatus}

Figure 3:
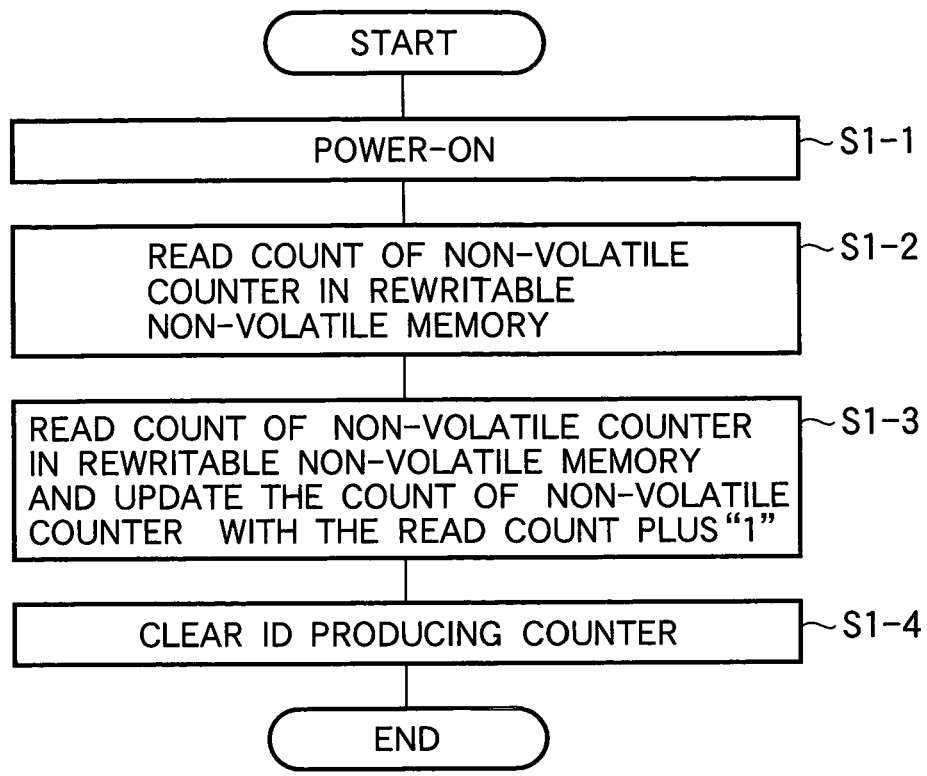

FIG. 3 is a flowchart illustrating the process performed shortly after the image forming apparatus 100 is turned on. The operation of the image forming apparatus according to the first embodiment will be described with reference to FIG. 3.

Step S1-1: The image forming apparatus 100 is turned on.

Step S1-2: The ID producing section 8 reads the count of the non-volatile counter 13-1 in the rewritable non-volatile memory 13.

Step S1-3: The ID producing section 8 reads the count from the ID non-volatile counter 13-1 in the rewritable non-volatile memory 13, and updates the count of the non-volatile counter 13-1 with the thus read count plus "1".

Step S1-4: The ID producing counter 11-3 is cleared.

Figure 4:
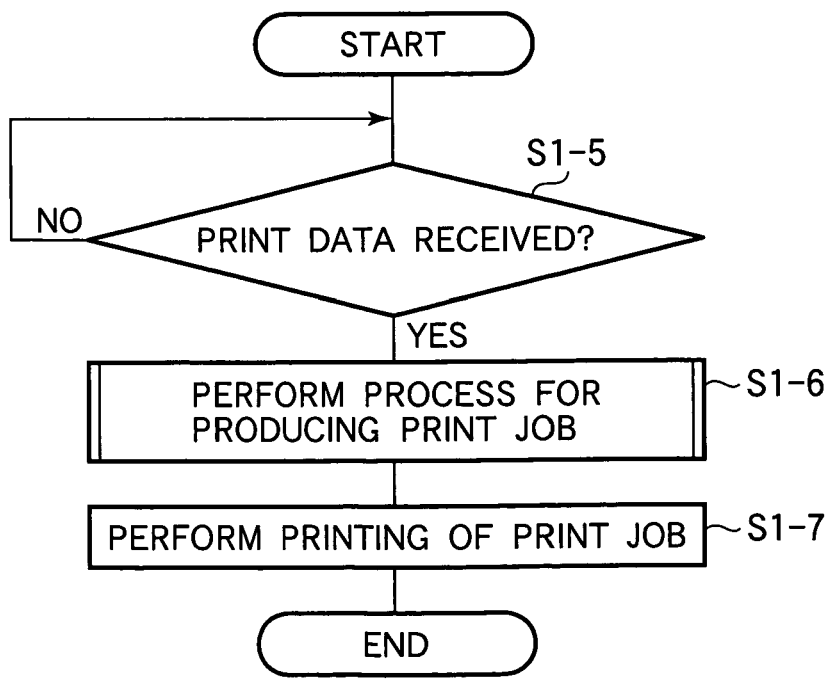
FIG. 4 is a flowchart illustrating the image forming process according to the first embodiment.

FIG. 4 is a flowchart illustrating the image forming process according to the first embodiment.

The flowchart illustrates the operation from when print data is received until a printing operation is initiated.

Step S1-5: When the interface 1 receives the print data from the host apparatus 20, the program proceeds to step S1-5.

Step S1-6: An image processing section 4 produces a print job. The ID producing section 8 produces an identification number, and stores the identification number into the ID number storing area 11-2 in the print job.

Step S1-7: The image forming section 5 prints the thus produced print job. Then, the program ends.

Figure 5:
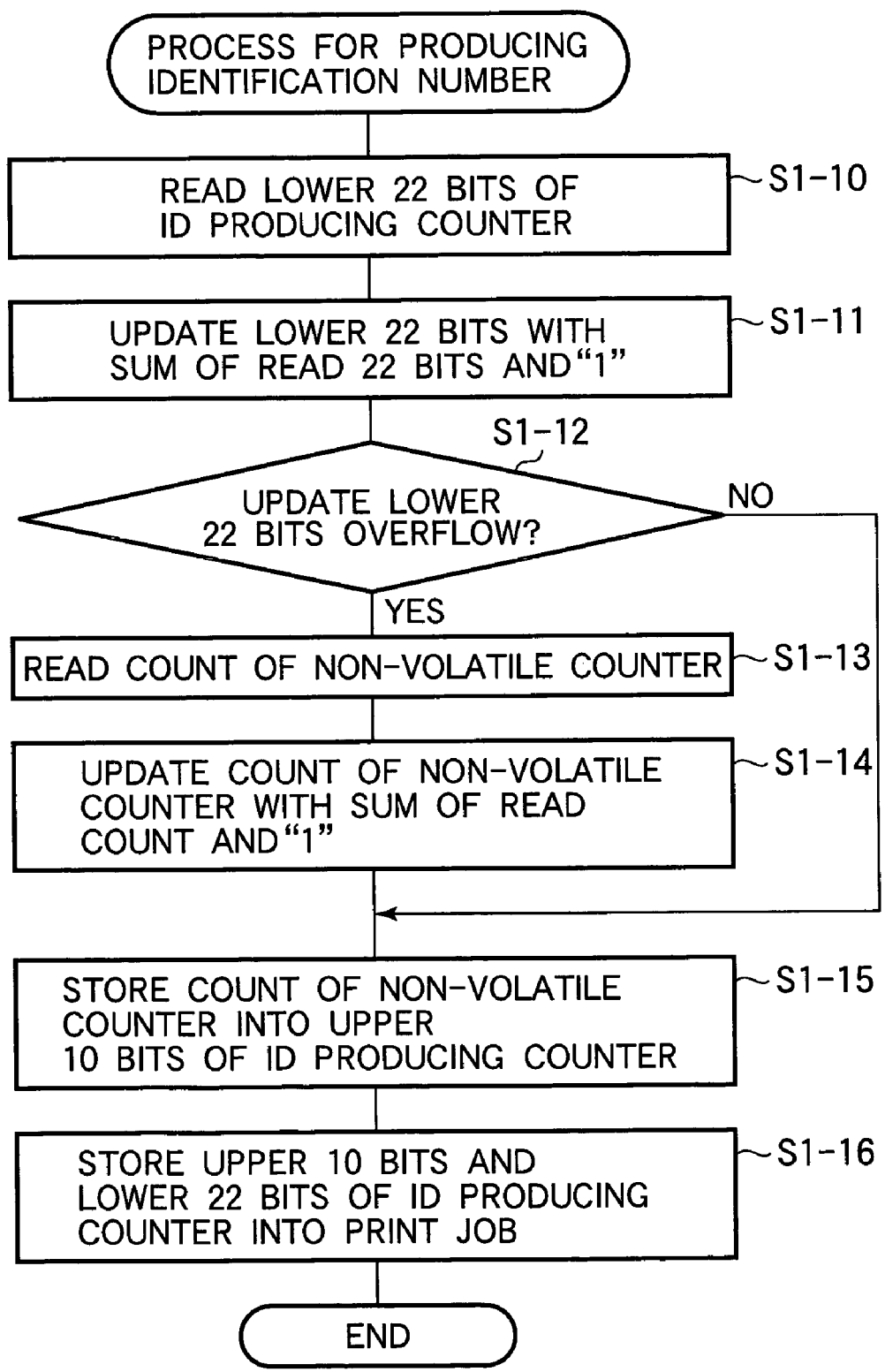
FIG. 5 is a flowchart illustrating the generation of an identification number according to the first embodiment.

FIG. 5 is a flowchart illustrating the generation of an identification number according to the first embodiment. The flowchart illustrates the operation from when the identification number is produced until the identification number is stored into the ID number storing area 11-2.

Step S1-10: The ID producing section 8 reads the lower area AL (lower 22 bits) of the ID producing counter 11-3.

Step S1-11: The ID producing section 8 updates the lower area AL with the thus read value plus "1."

Step S1-12: If the value of the updated lower area AL is "0" (i.e., the lower 22 bits overflow), the program proceeds to step S1-13. If the value has not become "0" yet, the program jumps to step S1-16.

Step S1-13: The ID producing section 8 reads the value of the counter of the non-volatile counter 13-1.

Step S1-14: The ID producing section 8 updates the value of the counter in the non-volatile counter 13-1 with the thus read value plus "1".

Step S1-15: The ID producing section 8 stores the value of the counter in the non-volatile counter 13-1 into the upper area AL (upper 10 bits) of the identification number counter 11-3.

Step S1-16: The ID producing section 8 takes the combination of the upper area AU and lower area AL, i.e., upper 10 bits and the lower 22 bits of the ID producing counter 11-3 to produce an identification number, and stores the thus produced identification number into the ID number storing area 11-2 of the print job 11-1.

As described above, because the image forming apparatus 100 is provided with the non-volatile counter 13-1 managed by the ID managing section 7, the upper value of the identification number can be identified every time the image forming apparatus 100 is turned on or the lower 22 bits of the ID producing counter 11-3 overflow. This prevents the previously generated identification number from being generated again every time the image forming apparatus 100 is turned on or the lower 22 bits of the ID producing counter 11-3 overflow. The ID producing counter 11-3 takes the form of a volatile memory, and is therefore reset every time the image forming apparatus 100 is turned on. However, after power-on of the image forming apparatus 100, the lower value of the identification number is incremented every time a print job is produced provided that the counter 11-3 does not overflow, so that the previously generated identification number will not be generated again. Thus, print jobs can be identified reliably. The non-volatile counter 13-1 in the non-volatile memory 13 is updated only on power-on of the image forming apparatus 100 and overflow of the lower 22 bits. This ensures that the non-volatile counter 13-1 is updated at a least number of times. Thus, a FLASH memory or an EEPROM may be employed without practical problems.

In the first embodiment, the input/out port 2, image processing section 4, and image forming section 8 have been described as being a computer based means activated when the CPU 9 executes the program in the HDD 12 or ROM 10. However, the invention is not limited to this embodiment. In other words, all or some of the input/output port 2, image processing section 4, image forming section 5, and ID producing section 8 may be configuration by exclusive electronic circuits. Further, while the 32-bit identification number has been apportioned into the upper 10 bits and the lower 22 bits, the 32 bits may be apportioned in different ways.

Second Embodiment

{Construction}

If the print data received from a host apparatus 20 is, for example, status-requesting data or menu-setting data that are not to be printed, such data need not be managed nor do the identification numbers need to be different from one another. Therefore, the identification numbers stored in the print jobs may be re-used.

Figure 6:
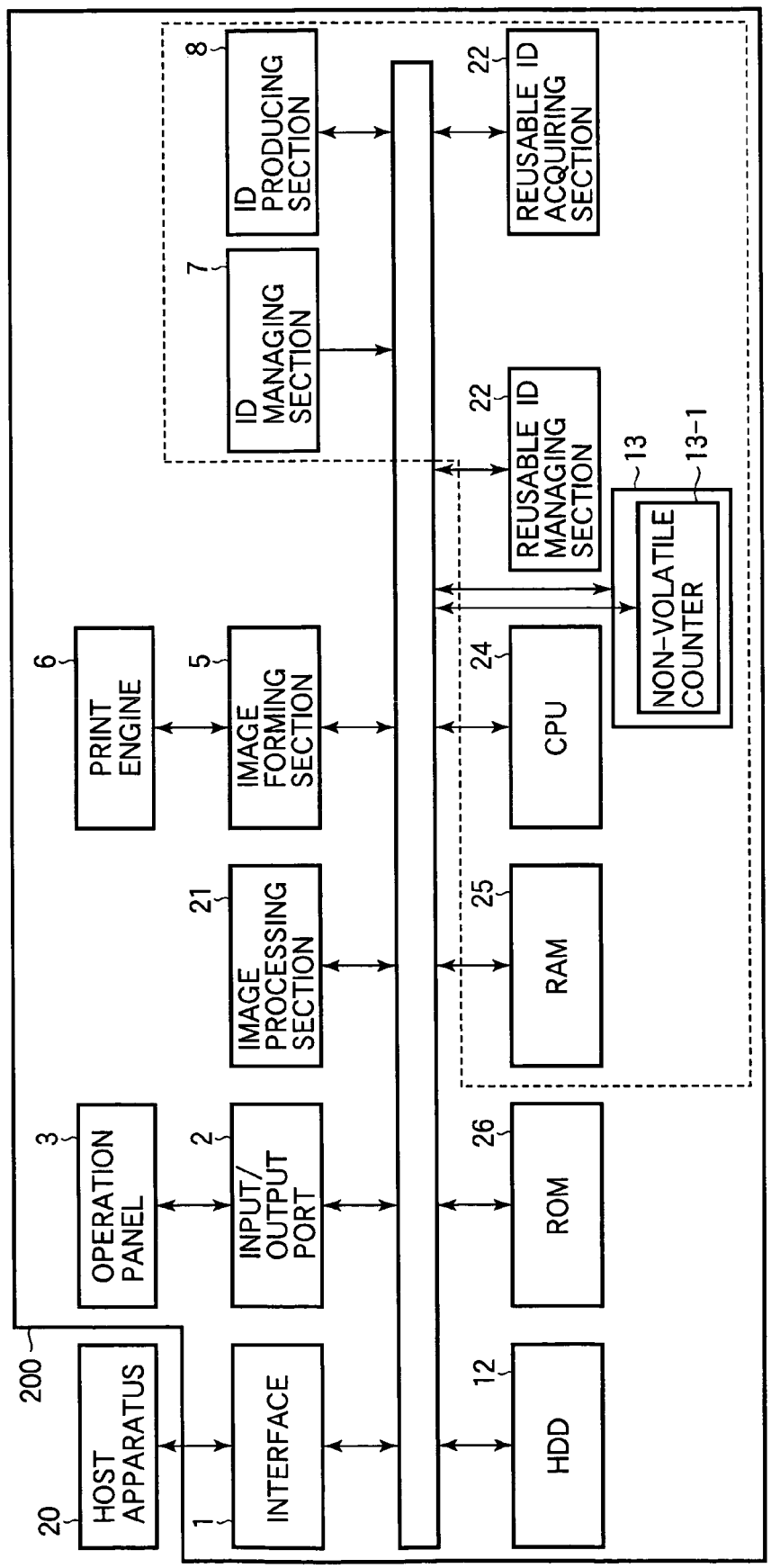
FIG. 6 is a block diagram illustrating the configuration of an image forming apparatus according to the invention.

FIG. 6 is a block diagram illustrating the configuration of an image forming apparatus 200 according to the invention. A second embodiment will be described in terms of a portion different from the first embodiment. Elements similar to those in the first embodiment have been given the same reference numerals and their description is omitted.

An image processing section 21 analyzes the print data received through an interface 1 from the host apparatus 20 to convert the print data into bit map data, which is ready to print. The image processing section 21 then expands the bit map data in an area of a RAM 25. It is to be noted that the print job is produced in the image processing section 21. The image processing section 21 also stores state transitions in a cumulative print job status displaying area, which will be described later. Further, the image processing section 21 checks the print-job-status displaying area to determine whether an editing/printing status exists. If no an editing/printing status remains in the print job status displaying area, then an identification number infuse is temporarily saved into a reusable ID managing section 22. The image processing section 21 is a computer based means activated when the CPU 24 executes a program stored in a ROM 26.

The reusable ID managing section 22 is an area of the RAM 25 and temporarily holds the identification number that can be re-used. The reusable ID managing section 22 will be described later in detail with reference to other drawings. A reusable ID acquiring section 23 re-uses the identification numbers, and will be described later in detail with reference to other drawings. The reusable ID acquiring section 23 is a computer based control means activated when the CPU 24 executes a program stored in the ROM 26.

The CPU 24 is a microprocessor that performs the overall control of the image forming apparatus 200. The CPU 24 executes the programs stored in the ROM 26 to activate the input/output port 2, image processing section 4, image forming section 5, ID producing section 8, and reusable ID acquiring section 23.

The RAM 25 is a volatile memory, and provides an operation area used when the CPU 24 executes the program stored in the ROM 26. In the second embodiment, print jobs are produced in the RAM 25. The RAM 25 also includes the 22-bit counter(i.e., a later described lower area AL) used for producing the print job identification information required when the ID producing section 8 produces print job identification information, and reusable ID managing section 22.

The ROM 26 stores the program for performing the overall control of the image forming apparatus 200, and part of the control data required for the overall control. The CPU 25 executes the programs to activate the input/output port 2, image processing section 4, image forming section 5, ID producing section 8, reusable ID managing section 22, and reusable ID acquiring section 23.

{Image Data}

The image data received from the host apparatus 20 (FIG. 6) will be described.

Figure 7:
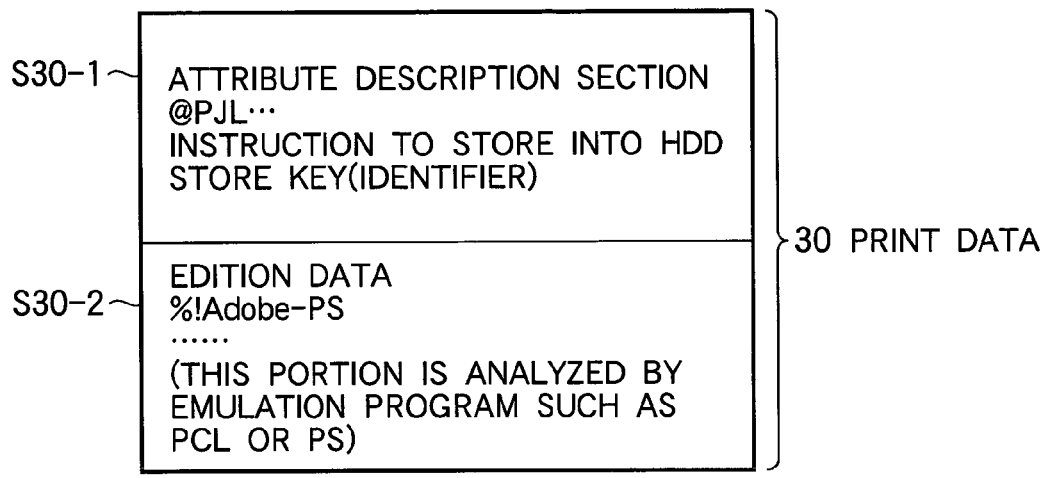
FIG. 7 illustrates the configuration of print data.

FIG. 7 illustrates the configuration of print data. Print data 30 includes an attribute description field 30-1 and an edition data 30-2. The attribute description field 30-1 is written in a description language referred to as printer job language (PJL), and describes attributes such as the number of copies and the name of a print job. The edition data filed 30-2 contains edition data processed under the control of an edition program of the printer, and is written in a description language such as PCL or PS. If the print data 30 does not contain the edition data 30-2, the edition program in the printer is not executed.

{State Transition}

Figure 8:
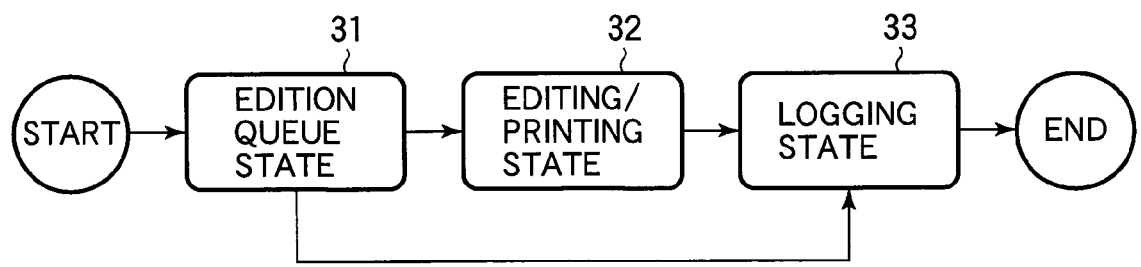
FIG. 8 illustrates the state transition of the print job according to the present invention.

The state transition that takes place in the print job will be described. FIG. 8 illustrates the state transition of the print job according to the present invention. Referring to FIG. 8, the print job is in an edition queue state 31 shortly after the production of a print job is initiated, then enters an editing/printing state 32 if the print data contains edition data written in the PCL or PS. Finally, the print job enters a logging state 33 after the entire processing of the print job has been completed. When the print job has entered logging state 33, only the process results of the print job and attribute information on the print job are stored into the HDD 26.

If the print data received from the host apparatus 20 (FIG. 6) does not contain edition data written in PS or PCS, the print job does not enter the editing/printing state 32 but directly enters the logging state 33.

{Functions of Reusable ID Managing Section and Reusable ID Acquiring Section}

The functions of the reusable ID managing section 22 and reusable ID acquiring section 23 will be described.

Figure 9:
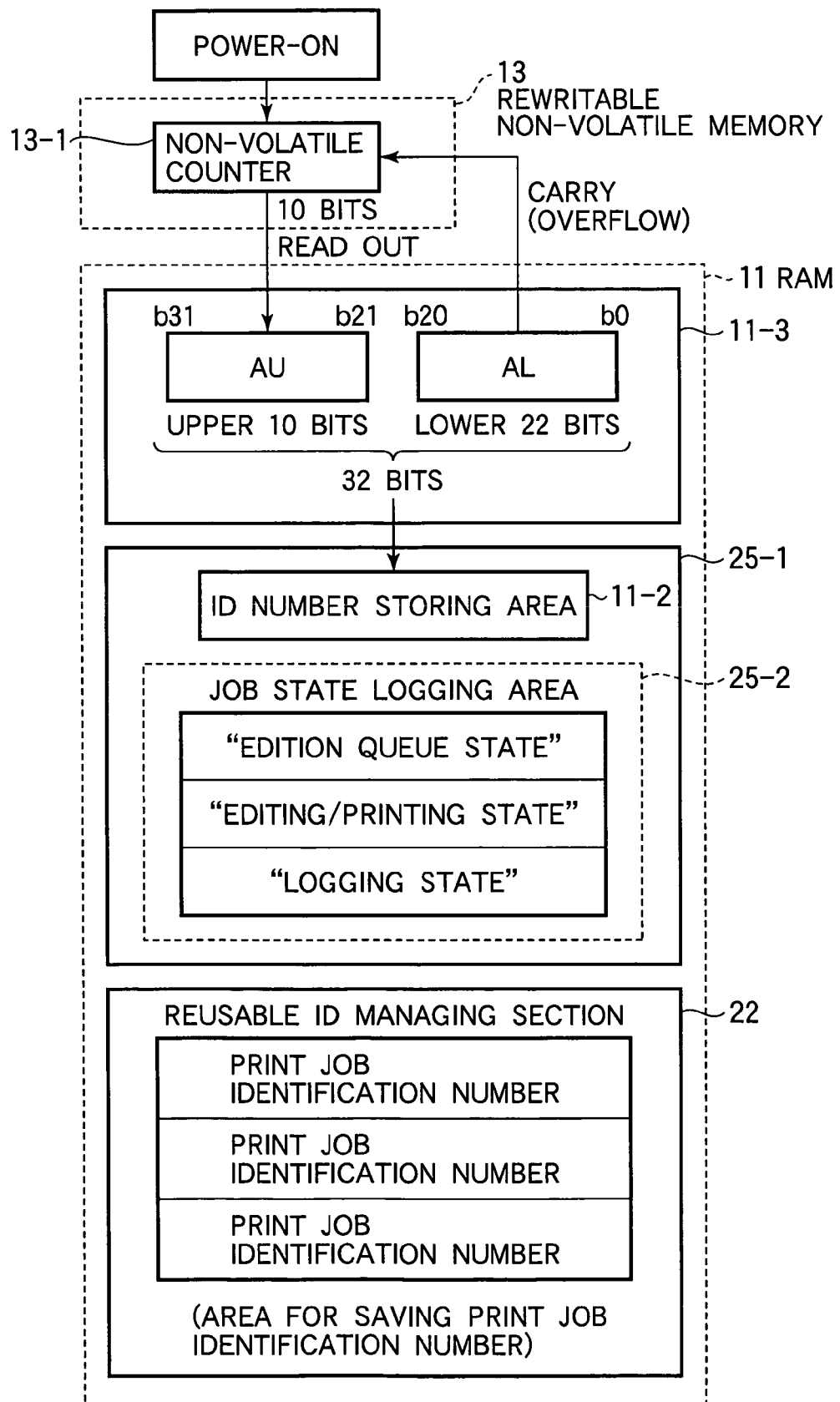
FIG. 9 illustrates the management and generation of the reusable ID.

FIG. 9 illustrates the management and generation of the reusable ID. Referring to FIG. 9, when the image forming apparatus 200 (FIG. 6) is turned on and print data is received, the production of a print job 25-1 is initiated in an area of the RAM 25 (FIG. 6). The print job 25-1 contains an ID number storing area 11-2 and a job state logging area 25-2. The RAM 25 contains an ID number producing counter 11-3 and the reusable ID managing section 22 that stores the reusable ID therein. Further, a rewritable non-volatile memory 13 contains a non-volatile counter 13-1 in the form of a 10-bit counter which operates independently of whether the printer is turned on. The non-volatile counter 13-1 is managed by the ID managing section 7.

The ID producing counter 11-3 is a 32-bit counter that includes an upper area AU for upper 10 bits and a lower area AL for lower 22 bits. The upper area AU receives the count of the non-volatile counter 13-1 and therefore holds the same count as the non-volatile counter 13-1. The lower 22 bits represent the number of print jobs produced. When the image forming apparatus 100 is turned on, the lower area AL is cleared and then counts up by one every time a new print job is produced. When the lower area AL (lower bits) of the counter overflow, all of the 22 bits in the lower area AL are cleared and at the same time the non-volatile counter 13-1 counts up by one (i.e., carry). The value of the non-volatile counter 13-1 is then stored into the upper area AU of the ID producing counter 11-3.

The thus obtained count of the ID number producing counter 11-3 is stored into the ID number storing area 11-2 of the print job 11-1. Thus, there is no chance of two or more same identification numbers are used.

Of the identification numbers that were once assigned to print jobs in the past, identification numbers that may be reused for the following print jobs are stored in the reusable ID managing section 22. The reusable ID numbers are used when the editing/printing state is not in the job state logging area 25-2. The fact that the editing/printing state is not in the job state logging area 25-2 implies that the data received from a host apparatus is data such as status inquiring data or menu setting data that are not to be printed. Therefore, the identification number may be reused without any problem.

{Image Forming Process}

Figure 10:
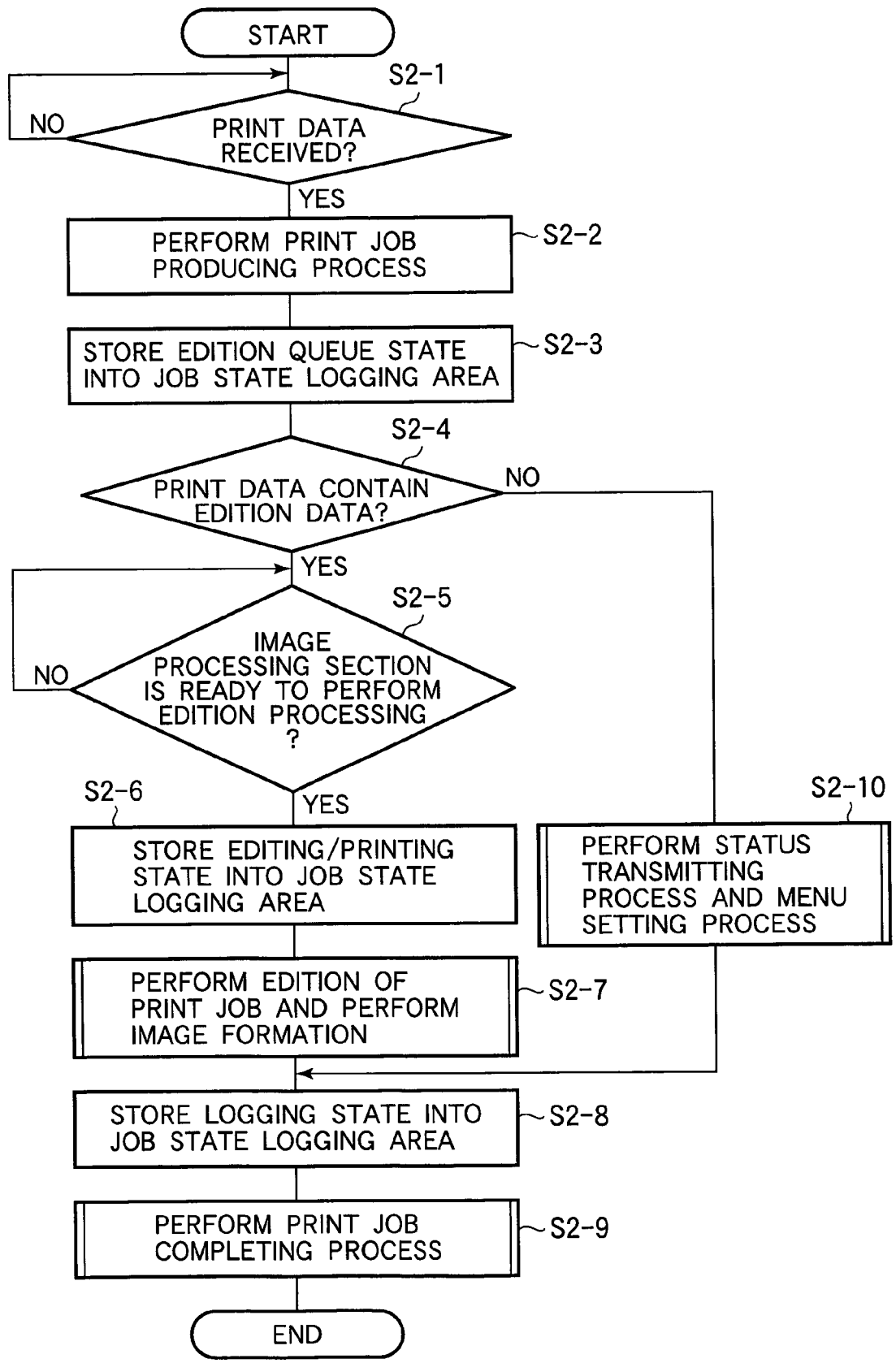
FIG. 10 is a flowchart illustrating the image forming process according to the second embodiment.

FIG. 10 is a flowchart illustrating the image forming process according to the second embodiment. The operation of the image forming apparatus 200 according to the second embodiment will be described with reference to FIG. 10. The flowchart illustrates the operation from when the image forming apparatus 200 receives the print data from the host apparatus 20 until printing is initiated.

Step S2-1: An interface 1 (FIG. 6) is in a standby state waiting for print data to be transmitted from the host apparatus 20 (FIG. 6). Upon reception of the print data, the program proceeds to step S2-2.

Step S2-2: The image processing section 21 initiates the print job producing process. When the print job producing process is performed, the ID producing section 8 (FIG. 6) produces an identification number or the reusable ID acquiring section 23 (FIG. 6) obtains a reusable identification number from the reusable ID managing section 22 and assigns the thus obtained reusable identification number to a new print job. In other words, the image processing section 21 stores the thus produced identification number or the obtained identification number into the ID number storing area 11-2 (FIG. 9). The production of the identification number will be described later in more detail.

Step S2-3: The image processing section 21 (FIG. 6) stores the edition queue state 31 into the job state logging area 25-2 (FIG. 9).

Step S2-4: If the print data 30 (FIG. 7) contains the edition data 30-2, the program proceeds to step S2-5. If the print data 30 does not contain the edition data 30-2, the program proceeds to step s2-8.

Step S2-5: The image processing section 21 waits until the edition processing can be carried out. Once the apparatus becomes ready to perform the edition processing, the program proceeds to step S2-6.

Step S2-6: The image processing section 21 stores the "edition/printing state" into the job state logging area 25-2.

Step S2-7: The image processing section 21 initiates the edition of the print job, and the image forming section 5 (FIG. 6) initiates image formation.

Step S2-8: The image processing section 21 stores the "logging state" into the job state logging area 25-2.

Step S2-9: The image processing section 21 carries out the print job completing process. Then, the flowchart ends. The print job completing process will be described later in more detail.

Step S2-10: The image processing section 21 performs a status transmitting process and a menu setting process. Then, the program proceeds to step S2-8.

{Producing Identification Number}

Figure 11:
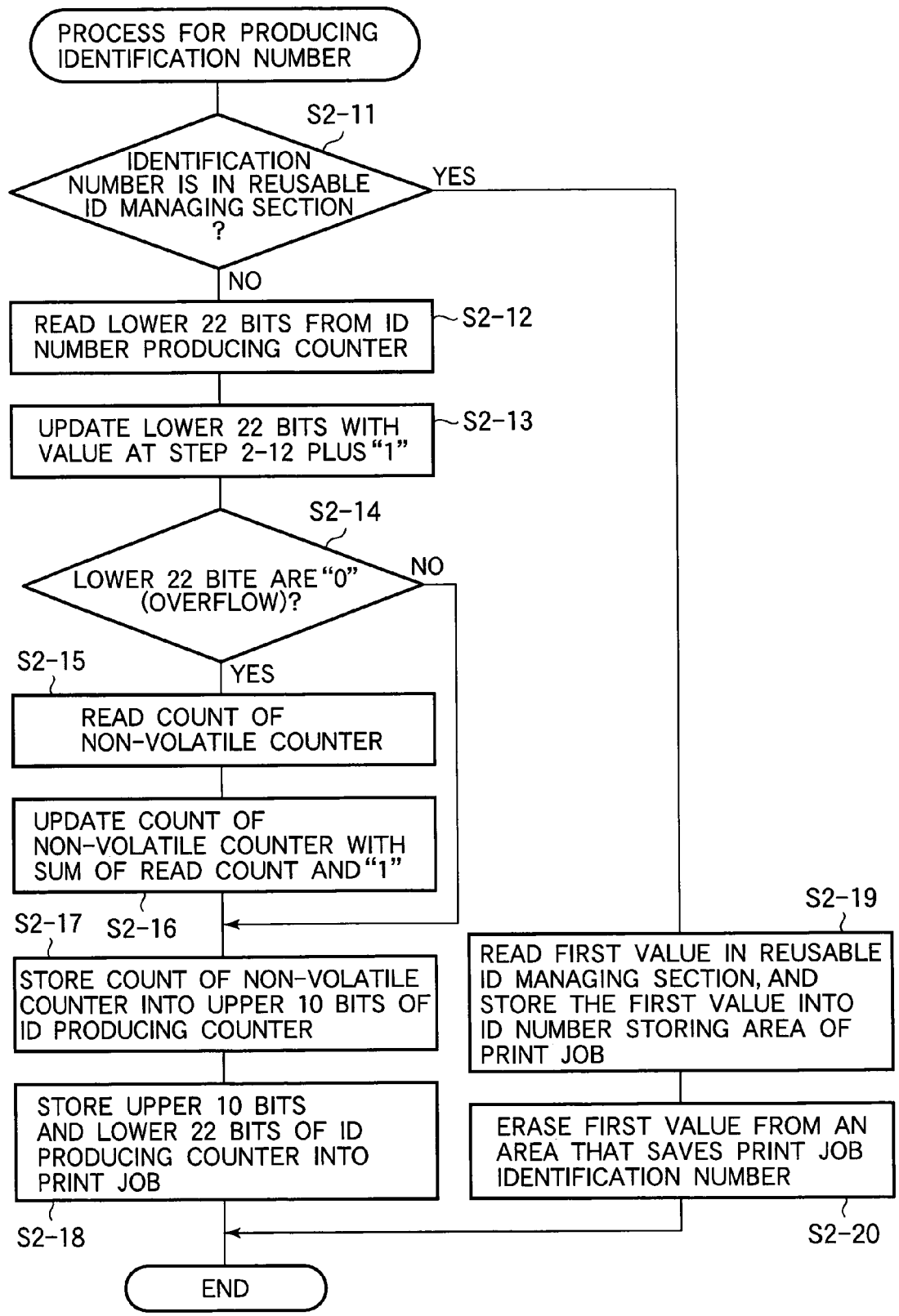
FIG. 11 is a flowchart illustrating the process for producing an identification number.

FIG. 11 is a flowchart illustrating the process for producing an identification number. The flowchart illustrates the operation from when the ID producing section 8 produces an identification number or the reusable ID acquiring section 23 obtains a reusable identification number from the reusable ID managing section 22 until the identification number is stored into the ID number storing area 11-2.

Step S2-11: The image processing section 21 searches for an identification number in the reusable ID managing section 22. If an identification number is not found, the program proceeds to step S2-12. If an identification number is found, the program jumps to step S2-20.

Step S2-12: The ID producing section 8 reads the lower area AL (lower 22 bits) from the ID number producing counter 11-3.

Step S2-13: The ID producing section 8 updates the lower area AL of the ID number producing counter 11-3 with the thus read count plus "1."

Step S2-14: When the updated the lower area AL are "0" (i.e., overflows), the program proceeds to step S2-15. If the updated the lower area AL are not "0," then the program jumps to step S2-17.

Step S2-15: The ID producing section 8 controls the ID managing section 7 to read the value of the counter of the non-volatile counter 13-1.

Step S2-16: The ID producing section 8 adds "1" to the count read at step S2-15. The ID managing section 7 updates the value of the counter of the non-volatile counter 13-1 with the thus read count plus "1."

Step S2-17: The ID producing section 8 stores the value of the counter of the non-volatile counter 13-1 into the upper area AU (upper 10 bits) of the ID producing counter 11-3.

Step S2-18: The ID producing section 8 produces an identification number by combining the upper area AU of the ID producing counter 11-3 with the lower area AL of the ID producing counter 11-3. The ID producing section 8 then stores the thus produced identification number into the ID number storing area 11-2 of the print job 25-1.

Step S2-19: The reusable ID acquiring section 23 reads the first value (FIG. 9) in the reusable ID managing section 22, and stores the first value into the ID number storing area 11-2 of the print job 25-1.

Step S2-20: The reusable ID acquiring section 23 erases the first value from the reusable ID managing section 22. This completes the process for producing an identification number.

{Print Job Completion Process}

Figure 12:
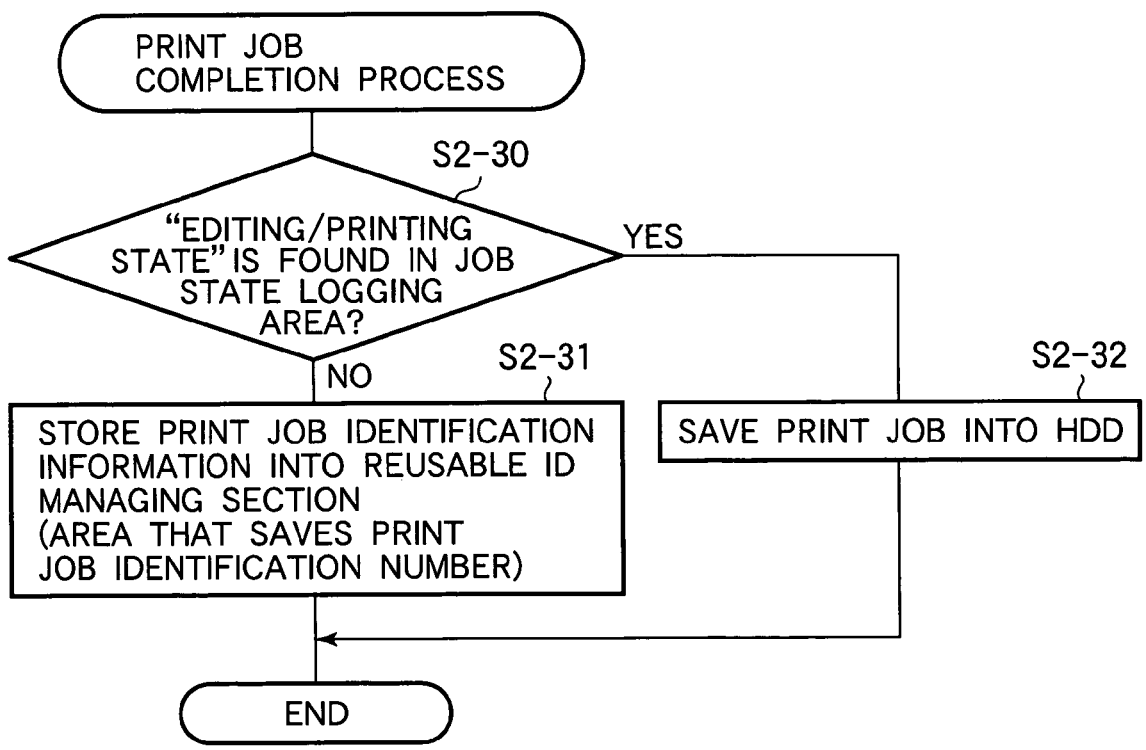
FIG. 12 is a flowchart illustrating a print job completion process according to the second embodiment.

FIG. 12 is a flowchart illustrating a print job completion process according to the second embodiment.

The flowchart illustrates the following signal processing. The image forming section 21 searches the job state logging area 25-2 in the print job for the "edition/printing state". If no "edition/printing state" is found in the job state logging area 25-2, the image forming section 21 reads an identification number from the ID number storing area 11-2, and then saves the identification number into the reusable ID managing section 22.

Step S2-30: The image forming section 21 searches the job state logging area 25-2. If the "edition/printing state" is found in the job state logging area 25-2, the program proceeds to step S2-32, if not, the program proceeds to step S2-31.

Step S2-31: The image processing section 21 stores the identification number in the ID number storing area 11-2 into the reusable ID managing section 22.

Step S2-32: The image processing section 21 saves the print job to the HDD 2. This completes the print job completion process.

As described above, the image forming apparatus according to the second embodiment is provided with the reusable ID managing section 22 and reusable ID acquiring section 23 in addition to the configuration of the first embodiment. Therefore, the second embodiment eliminates the problem that identification numbers are assigned to print jobs that do not contain data to be printed and are therefore not worthwhile to save. The configuration of the second embodiment reduces greatly the number of times of updating the counter in the volatile memory. This is advantageous when the image forming apparatus employs a non-volatile memory such as a FASH memory or EEPROM that is limited in the number of times of writing data.

The first and second embodiments have been described in terms the input/output port 2, image processing section 21, image forming section 5, ID producing section 8, and the reusable ID acquiring section 23, which are predetermined computer based means activated when the CPU 24 executes a program stored in the HDD 26 or ROM 10. The present invention is not limited to these computer based means. In other words, all of or some of the input/output port 2, image processing section 21, image forming section 5, ID producing section 8, and the reusable ID acquiring section 23 may be configured in the form of exclusive electronic circuits.

Third Embodiment

The non-volatile counter defined in the rewritable non-volatile memory 13 according to the first and second embodiments has a memory area of a fixed size (i.e., 10 bits). However, a fixed memory size may cause a problem. For example, the count may exceed 10 bits. On the other hand, a counter with a large number of bits is uneconomical. In a third embodiment, when the count of the non-volatile counter exceeds a predetermined value, the number of bits of the non-volatile counter is increased automatically.

{Construction}

Figure 13:
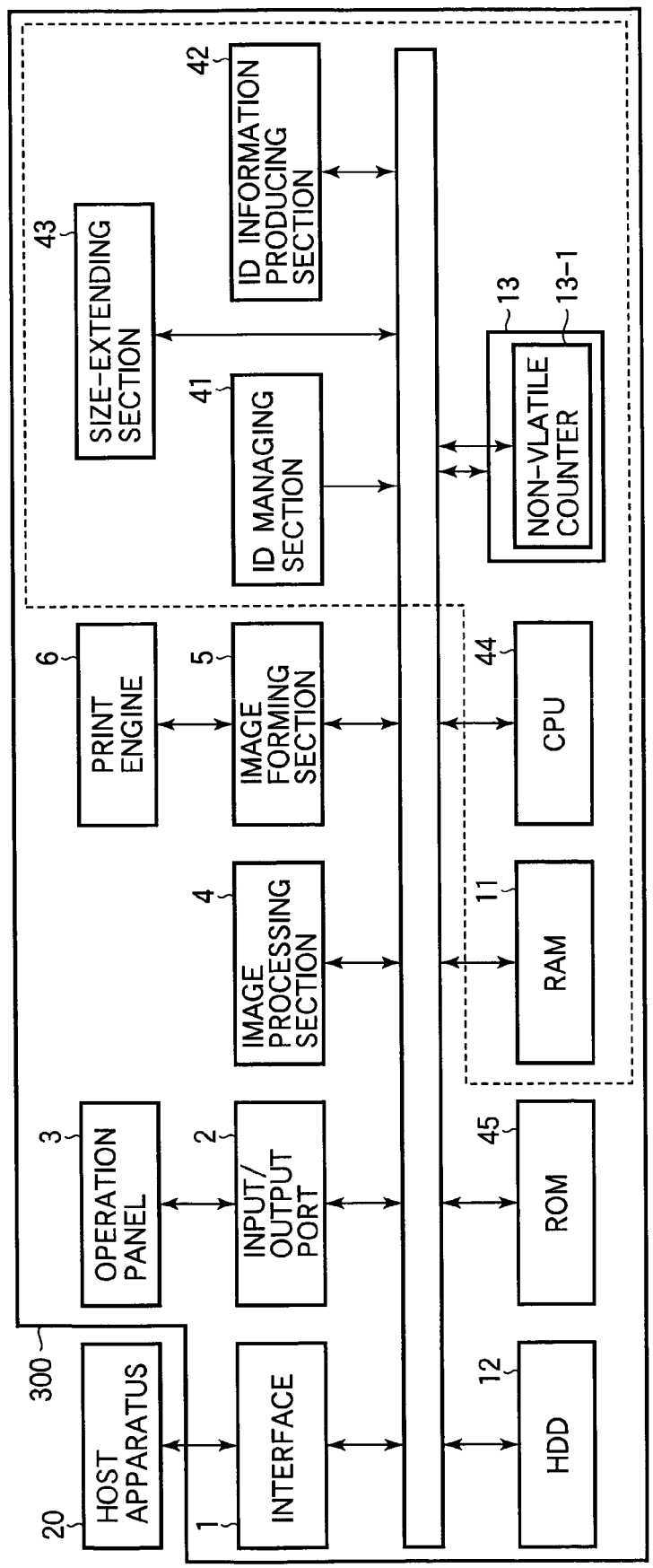
FIG. 13 is a block diagram illustrating the configuration of an image forming apparatus according to the third embodiment.

FIG. 13 is a block diagram illustrating the configuration of an image forming apparatus 300 according to the third embodiment. Referring to FIG. 13, the image forming apparatus 300 includes an interface 1, input/output port 2, operation panel 3, image processing section 4, image forming section 5, print engine 6, ID managing section 41, ID information producing section 42, size extending section 43, CPU 44, ROM 45, RAM 11, HDD 12, and rewritable non-volatile memory 13. The third embodiment will be described in terms of portions different from the first embodiment. Elements similar to those of the first embodiment have been given the same reference numerals and their description is omitted.

The ID managing section 41 is a program that manages the count of a non-volatile counter 13-1 configured to increase in size in increments of 32 bits. The counter has 32 bits initially. When the image forming apparatus 300 is turned on or when a 32-bit counter defined in the area of RAM 11 overflows, the count of the non-volatile counter is incremented by one. When the non-volatile counter overflows, the size of the non-volatile counter is increased in increments of 32 bits. This function will be described later in more detail.

The ID information producing section 42 produces print job identification information based on the count of the non-volatile counter 1.3-1 and the 32-bit counter. Then, the ID information producing section 42 stores the print job identification information into an ID number storing area defined in the print job.

The size extending section 43 detects when the non-volatile counter 13-1 overflows, and then increases the counter size in increments of 32 bits. The counter size is increased every time the non-volatile counter 13-1 overflows.

The CPU 44 is a microprocessor that performs overall control of the image forming apparatus 300. The ROM 45 stores the program executed by the CPU 44 for the overall control, and part of associated control data.

{Function of ID Managing Section, ID Information Producing Section, and Size Extending Section}

Figure 14:
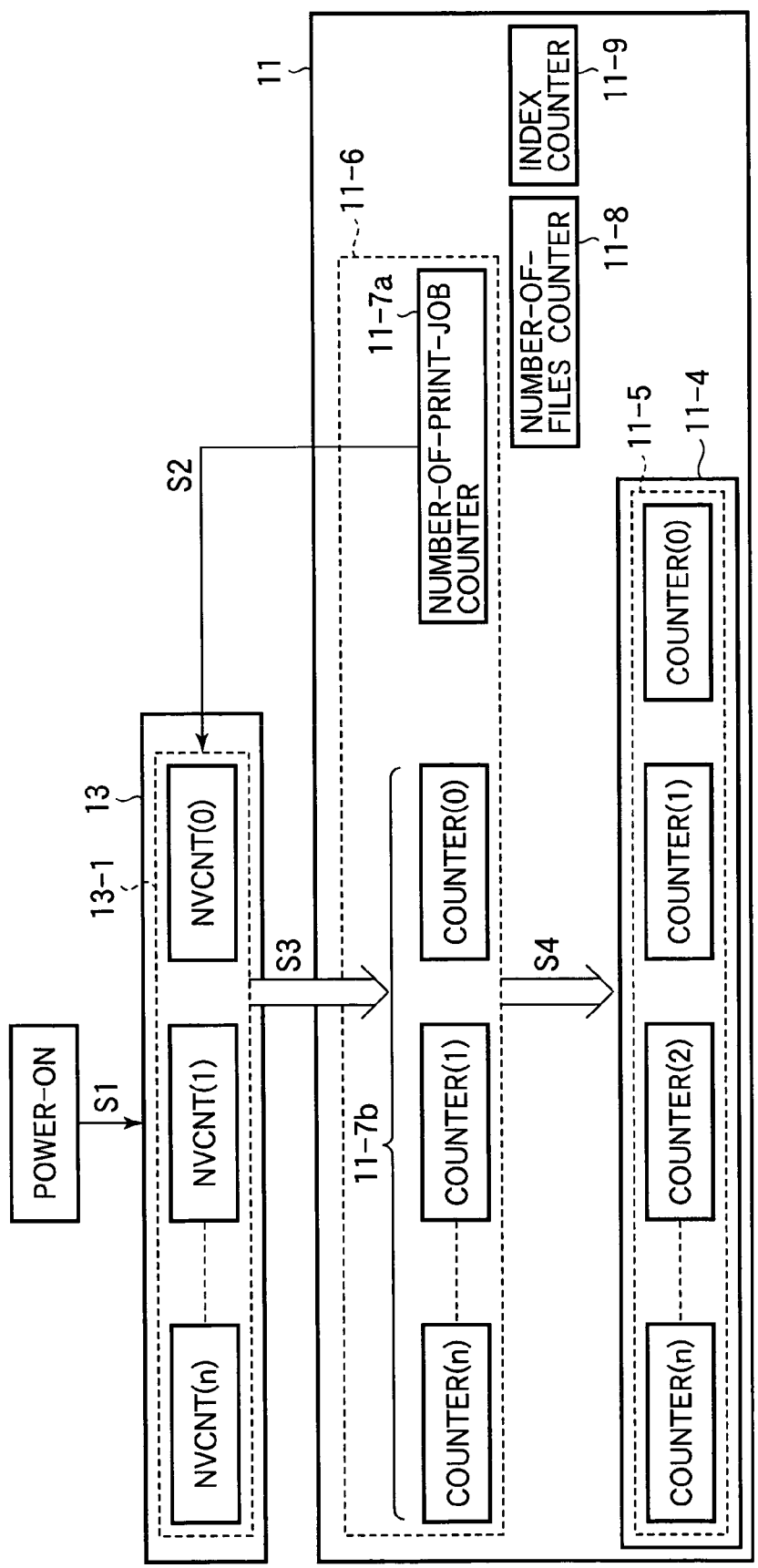
FIG. 14 illustrates the production and management of the identification information, and extension of the counter size.

The function of the ID managing section 41, ID information producing section 42, and size extending section 43 will be described. FIG. 14 illustrates the production and management of the identification information, and extension of the counter size.

Referring to FIG. 14, when the image forming apparatus 300 has been turned on and print data is received, the production of a print job 11-4 is initiated in an area of the RAM 11. The print job 11-4 contains an ID number storing area 11-5. The RAM 11 contains an ID number producing counter 11-6, a number-of-files counter 11-8 and an index counter 11-9. The number-of-files counter 11-8 and index counter 11-9 are used when the size extending section 43 makes a decision to determine whether the non-volatile counter 13-1 should be increased in size.

The identification information is produced based on the total cumulative number of print jobs generated after power-up of the image forming apparatus 300, and the history information of the previous print job production, which will be described later. The ID number producing counter 11-6 includes a 32-bit number-of-print-jobs counter 11-7a that counts the cumulative number of print jobs produced after the power-up of the image forming apparatus 300, and a print-job-history counter 11-7b that obtains the cumulative number of times of power-up of the image forming apparatus 300 and the cumulative number of times of carry of the number-of-print-jobs counter 11-7a by using the ID managing section 41.

The ID managing section 41 manages the history information. The ID managing section 41 manages a plurality of 32-bit counters NVCNT(0) to NVCNT (n) that may be extended in size in increments of 32 bits. When the ID managing section 41 receives a power-on information S1 after the image forming apparatus 300 is turned on, the counter NVCNT(0) counts up by one. When the ID managing section 41 receives an overflow information S2 from the number-of-print-jobs counter 11-7a, the counter NVCNT(0) also counts up by one.

The history information is accumulated as described above. When the counter NVCNT(0) overflows, the size extending section 43 increases the size of the non-volatile counter 13-1 by combining an additional 32-bit counter NVCNT(1) with the counter NVCNT(0). The counter NVCNT(1) represents higher digits of the resulting counter NVCNT(0)+NVCNT(1). Likewise, when the counter NVCNT(0)+NVCNT(1) overflows, the size extending section 43 increases the size of the ID non-volatile counter 13-1 by adding an additional 32-bit counter NVCNT(2), which represents higher digits of the counter NVCNT(0)+NVCNT(1)+NVCNT(2). In this manner, the ID managing section 41 manages the history information.

The ID information producing section 42 reads the count of counters NVCNT(0)–NVCNT(n), which serves as history information S3.

The history information S3 is stored into the print-job-history counter 11-7b. The ID information producing section 42 produces an identification number (identification information S4) from the count of the print-job-history counter 11-7b and the count of the number-of-print-jobs counter 11-7a, and stores the identification number into the ID number storing area 11-5 of the print job 11-4.

Figure 15:
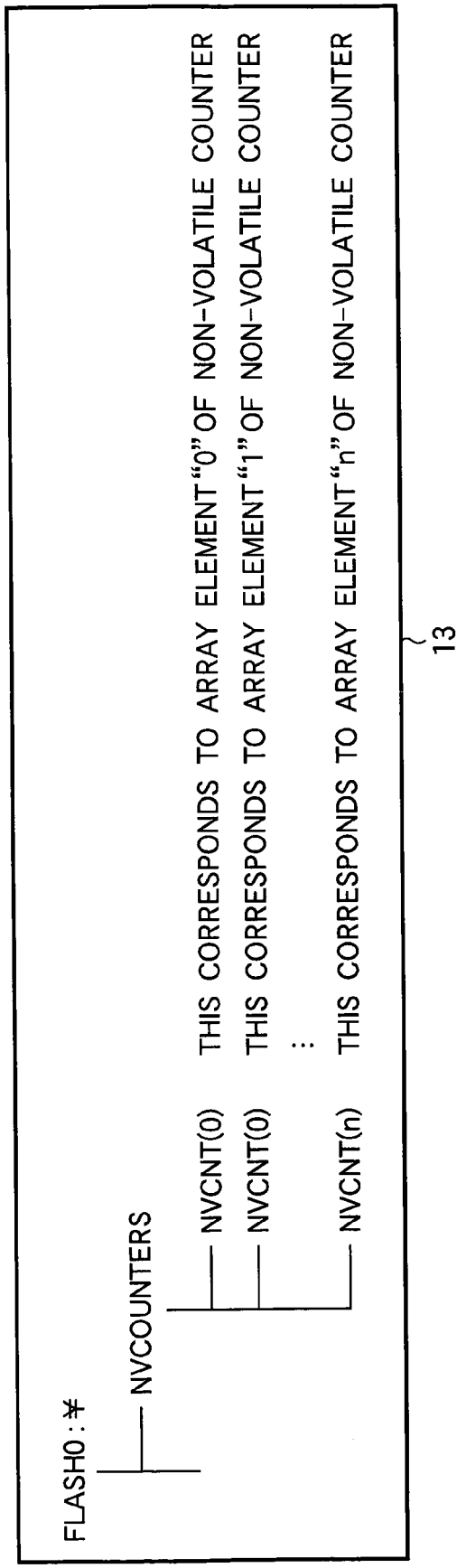
FIG. 15 illustrates the counters NVCNT(0)-NVCNT(n) and their directory defined in the rewritable non-volatile memory.

FIG. 15 illustrates the counters NVCNT(0)–NVCNT(n) and their directory defined in the rewritable non-volatile memory (e.g., FLASH memory) 13. The counters NVCNT (0)–NVCNT(n) will be described with reference to FIG. 15. The rewritable non-volatile memory 13 holds a volume "FLASH0:¥" and a directory "NVCOUNTERS". The NVCOUNTERS includes a plurality of files NVCNT(0) to NVCNT(n).

{Operation of Image Forming Apparatus}

Figure 16:
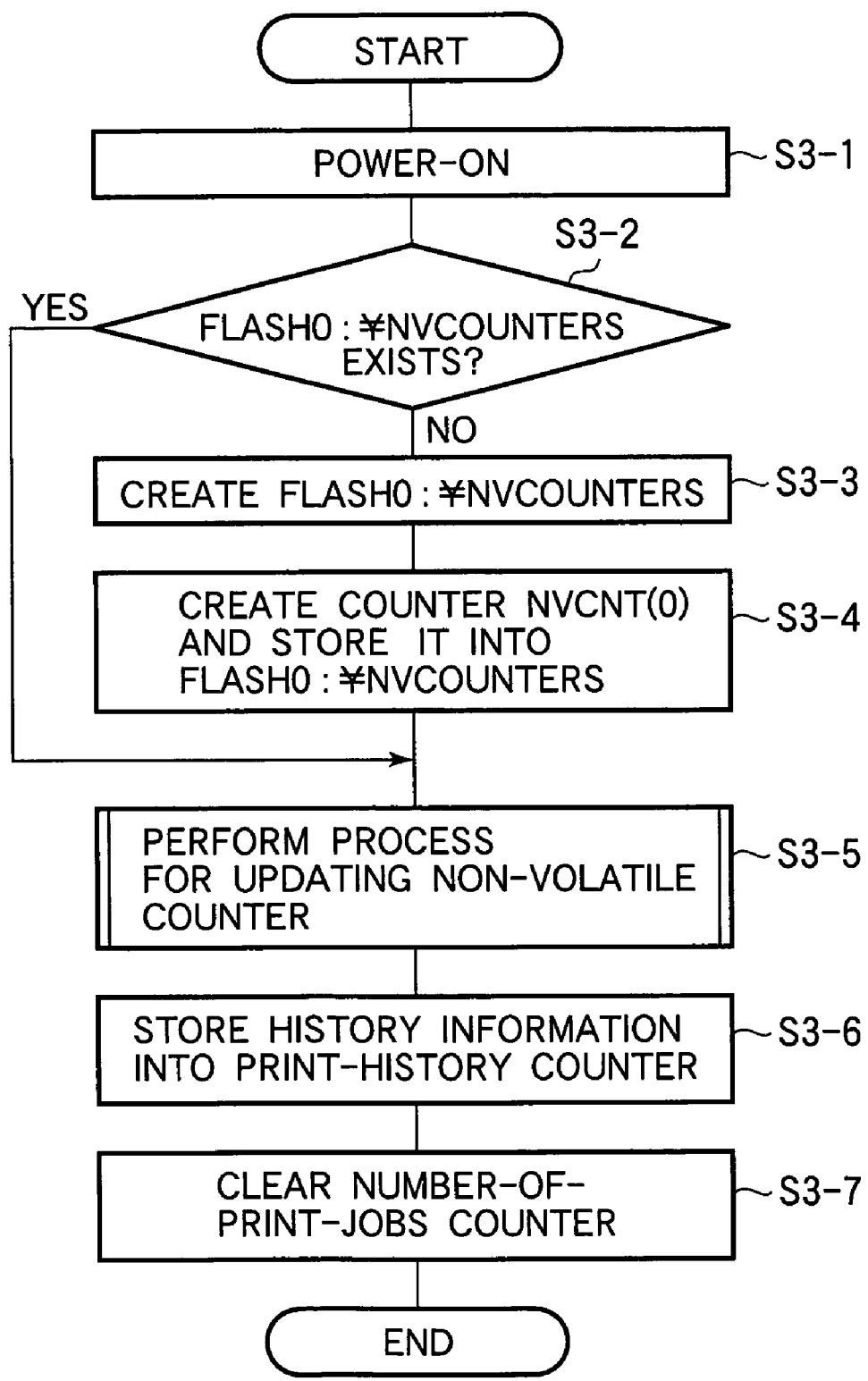

FIG. 16 is a flowchart illustrating the operation of the image forming apparatus 300 when the image forming apparatus is turned on. The operation of the image forming apparatus 300 according to the third embodiment will be described with reference to FIG. 16.

Step S3-1: The image forming apparatus 300 is powered on.

Step S3-2: The size extending section 43 makes a decision to determine whether FLASH0:¥NVCOUNTERS exists on the file system. If FLASH0:¥NVCOUNTERS exists, then the program jumps to step S3-5. If FLASH0:¥NVCOUNTERS does not exist, the program proceeds to step S3-3.

Step S3-3: The size extending section 43 creates FLASH0: ¥NVCOUNTERS.

Step S3-4: The size extending section 43 creates the counter NVCNT(0) and stores it into FLASH0:¥NV-COUNTERS.

Step S3-5: The ID managing section 41 updates the non-volatile counter 13-1. The process for updating the ID non-volatile counter 13-1 will be described later.

Step S3-6: The ID information producing section 42 controls the ID managing section 41 to read the history information S3 from the ID managing section 41, and stores the history information S3 into the print-job-history counter 11-7b.

Step S3-7: The ID information producing section 42 clears the number-of-print-jobs counter 11-7a and the program ends.

Figure 17:
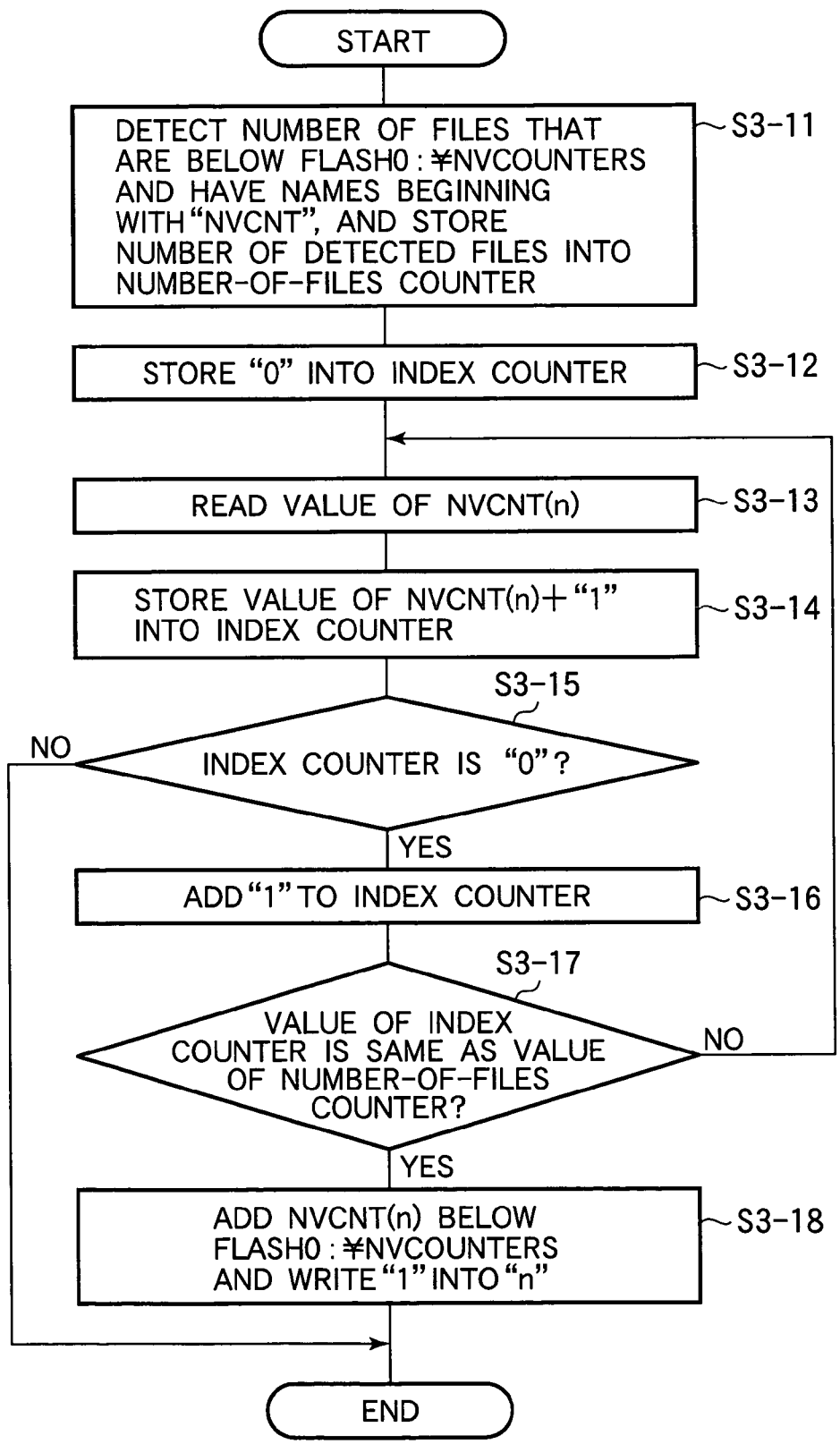
FIG. 17 is a flowchart illustrating the process for updating the non-volatile counter.

FIG. 17 is a flowchart illustrating the updating process performed by the ID managing section 41. In the flowchart, the size extending section 43 detects the overflow of the count of the non-volatile counter 13-1 in terms of the outputs of the number-of-files counter 11-8 (FIG. 14) and the index counter 11-9 (FIG. 14). Every time the ID non-volatile counter 13-1 overflows, the size extending section 43 adds a 32-bit counter to the non-volatile counter 13-1. The operation of the size extending section 43 will be described.

Step S3-11: The size extending section 43 detects the number of files below the directory FLASH:¥NVCOUNTERS and have names beginning with "NVCNT," and then stores the number of files into the number-of-files counter 11-8.

Step S3-12: The size extending section 43 stores "0" into the index counter 11-9 (FIG. 14). The index counter 11-9 is a counter that specifies the value of (n) of NVCNT(n).

Step S3-13: The size extending section 43 reads the count of the counter NVCNT(n) specified by the index counter 11-9.

Step S3-14: The size extending section 43 stores the count of the counter NVCNT(n) plus "1" into the index counter 11-9.

Step S3-15: If the resulting count of the index counter 11-9 is "0," then the program proceeds to step S3-16. If the resulting count of the index counter 11-9 is not "0," then the program ends. The fact that the resulting count of the index counter 11-9 is "0" implies that the counter NVCNT (n) has overflown. This indicates that an additional counter for the higher digits is needed.

Step S3-16: If the size extending section 43 adds "1" to the count of the index counter 11-9.

Step S3-17: If the count of the index counter 11-9 coincides with the count of the number-of-files counter 11-8, the program proceeds to step S3-18. If the count of the index counter 11-9 does not coincide with the count of the number-of-files counter 11-8, the program loops back to step S3-13. The fact that the count of the index counter 11-9 coincides with the count of the number-of-files counter 11-8 is that an additional counter NVCNT(n) for the higher digits has not provided yet.

Step S3-18: The size extending section 43 adds an additional counter NVCNT(n) specified by the count of the index counter 11-9 below FLASH:¥NVCOUTERS, and writes "1" into "n".

{Operation of ID Information Producing Section}

Figure 18:
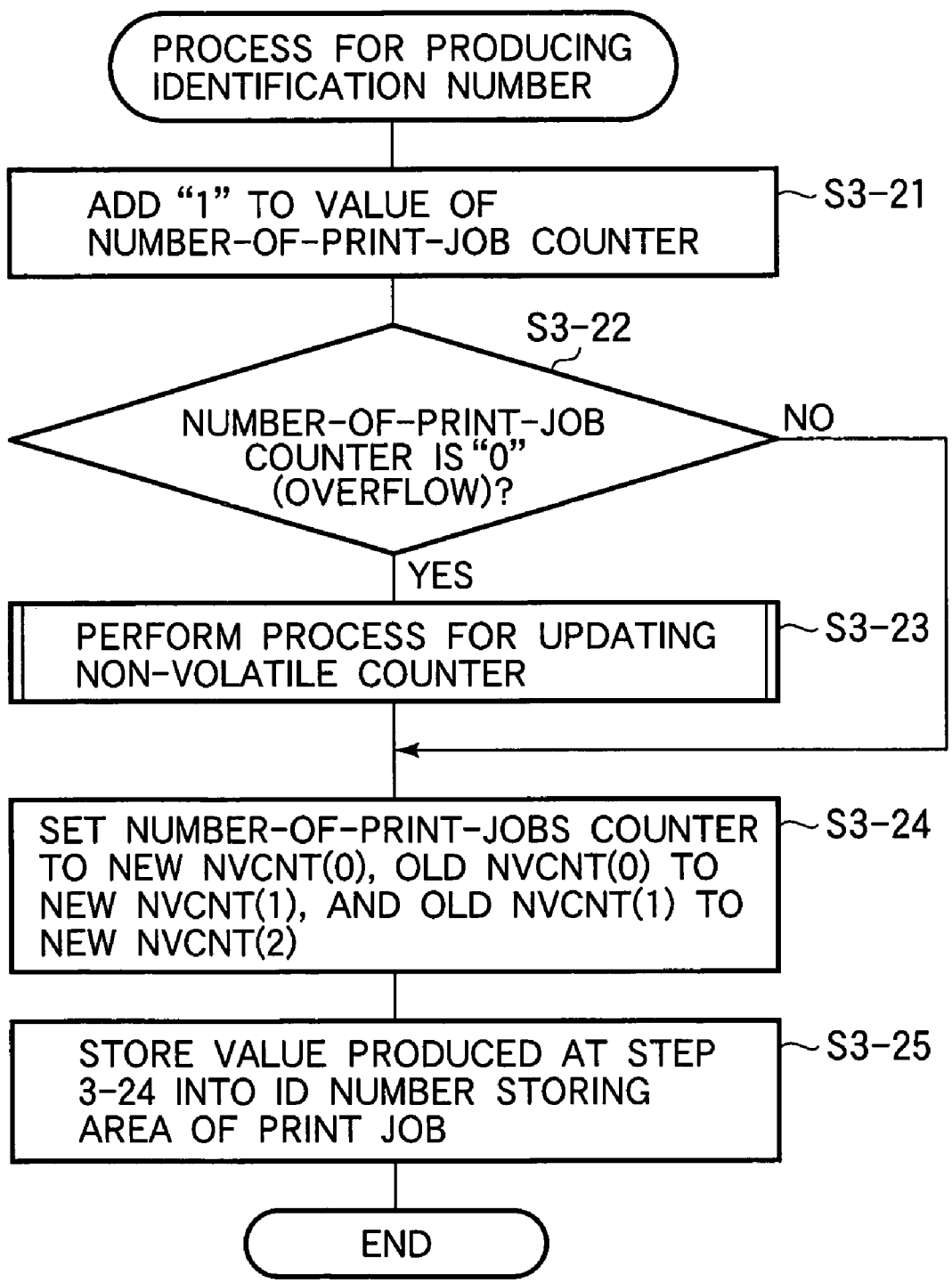
FIG. 18 is a flowchart illustrating the process for producing the identification number.

FIG. 18 is a flowchart illustrating the process for producing the identification number.

When the image processing section 4 (FIG. 13) is producing a print job, the ID information producing section 42 produces an identification number, and stores the identification number into the ID number storing area 11-5.

The operation of the ID information producing section 42 will be described.

Step S3-21: The ID information producing section 42 adds "1" to the count of the number-of-print-jobs counter 11-7a.

Step S3-22: If the count of the number-of-print-jobs counter 11-7a is "0", then the program proceeds to step S3-23. If the count of the number-of-print-jobs counter 11-7a is not "0", then the program jumps to step S3-24.

Step S3-23: The size extending section 43 performs the updating process performed by the ID managing section 41, described with reference to FIG. 17.

Step S3-24: The ID information producing section 42 sets the number-of-print-jobs counter 11-7a to a new NVCNT(0), the old NVCNT(0) to a new NVCNT(1), and the old NVCNT (1) to a new NVCNT(2), thereby creating a string of 32-bit integers.

Step S3-25: The ID information producing section 42 stores the thus produced string of 32-bit integers as print job identification information into the ID number storing area 11-5. Then, the program ends. The rest of the process is the same as that of the first embodiment and its description is omitted.

As described above, the print job identification information stored in the print job 11-4 allows unique identifying of a print job from all print jobs including those processed in the past irrespective of whether the image forming apparatus 30 has been turned on or off. Moreover, the counter has a minimum size initially and can then be increased in size as required.

Fourth Embodiment

{Construction}

A fourth embodiment has a configuration in which the administrator of an image forming apparatus 400 can update the value or count of the non-volatile counter 13-1 from outside of the image forming apparatus 400. This configuration allows the user to set a predetermined value to the beginning of the identification information of print jobs, for example, on a week-to-week basis or on a month-to-month basis. This makes management of print jobs easy.

Figure 19:
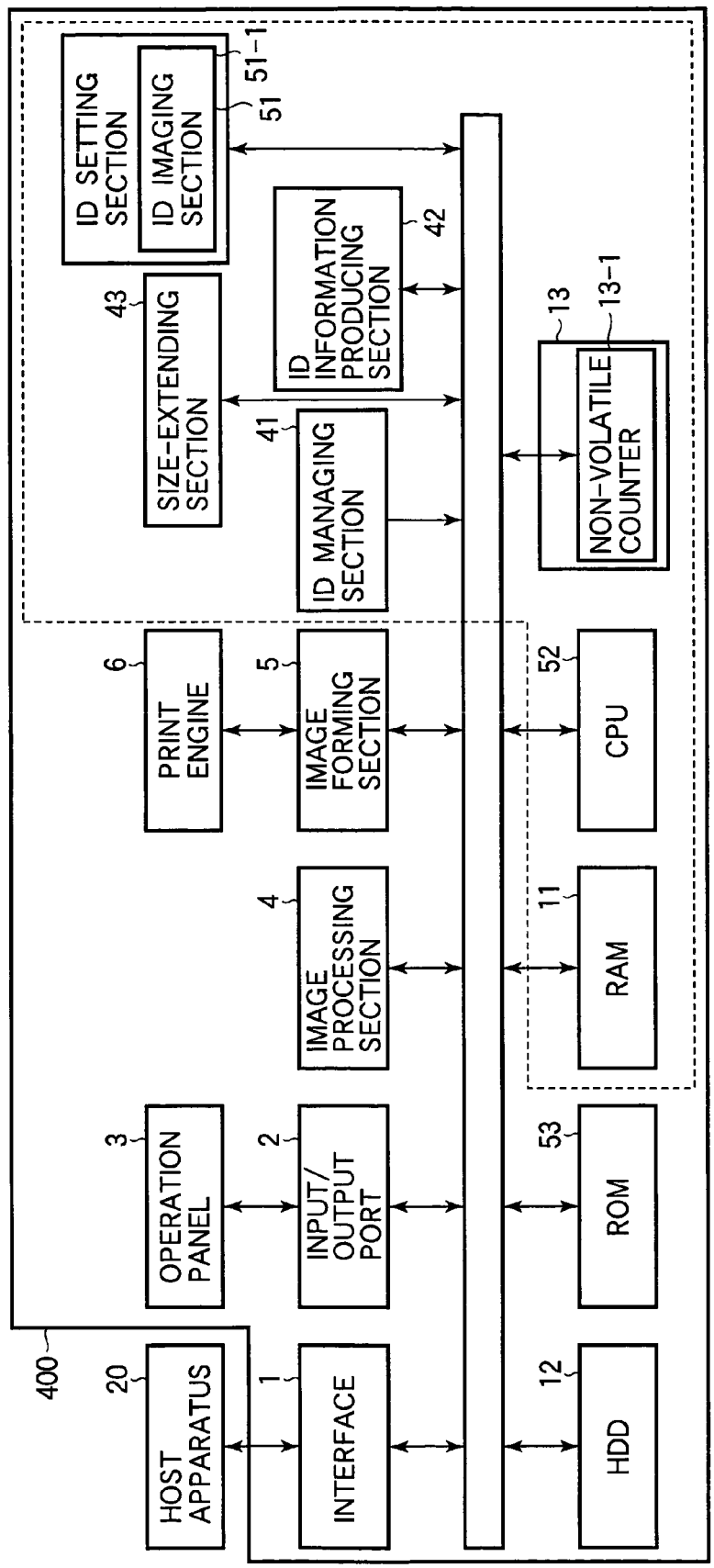
FIG. 19 is a block diagram illustrating the configuration of the image forming apparatus.

FIG. 19 is a block diagram illustrating the configuration of the image forming apparatus 400. Referring to FIG. 19, the image forming apparatus. 400 includes an interface 1, input/output port 2, operation panel 3, image processing section 4, image forming section 5, print engine 6, ID managing section 41, ID information producing section 42, size extending section 43, CPU 52, ROM 53, RAM 11, HDD 12, rewritable non-volatile memory 13, and ID setting section 51. A description will be given of a portion different from the third embodiment. Elements similar to those in the third embodiment have been given the same reference numerals and their description is omitted.

The ID setting section 51 includes an index counter 51-1, which will be described later in detail. The ID setting section 51 receives an identification-information setting PJL command contained in print data transmitted by the administrator from outside of the image forming apparatus. Then, the ID setting section 51 updates the setting managed by the ID managing section 41.

Figure 20:
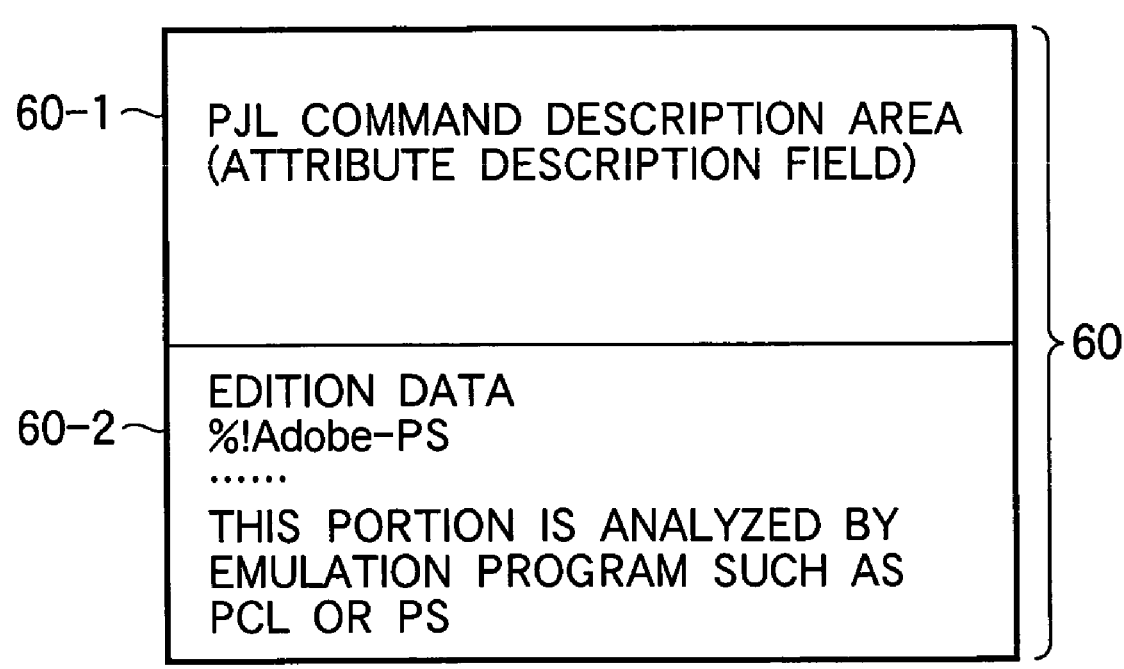
FIG. 20 illustrates the configuration of print data according to the fourth embodiment.

FIG. 20 illustrates the configuration of print data according to the fourth embodiment.

Referring to FIG. 14, print data 60 includes a PJL command description field 60-1 and an edition data field 60-2. The PJL command description field 60-1 is written in a description language referred to as PJL, and describes settings from the operator that sends a print job. The settings include primarily the number of copies, the name of the print job, and information for setting the ID information. The edition data field 60-2 contains edition data that is written in a page description language such as PCL or PS, and is processed under the control of the program in the image processing section 4 (FIG. 19). If the print data 60 does not include the edition data field 60-2, the program in the image processing section 4 will not be executed so that the image forming apparatus 400 will not perform printing.

Figure 21:
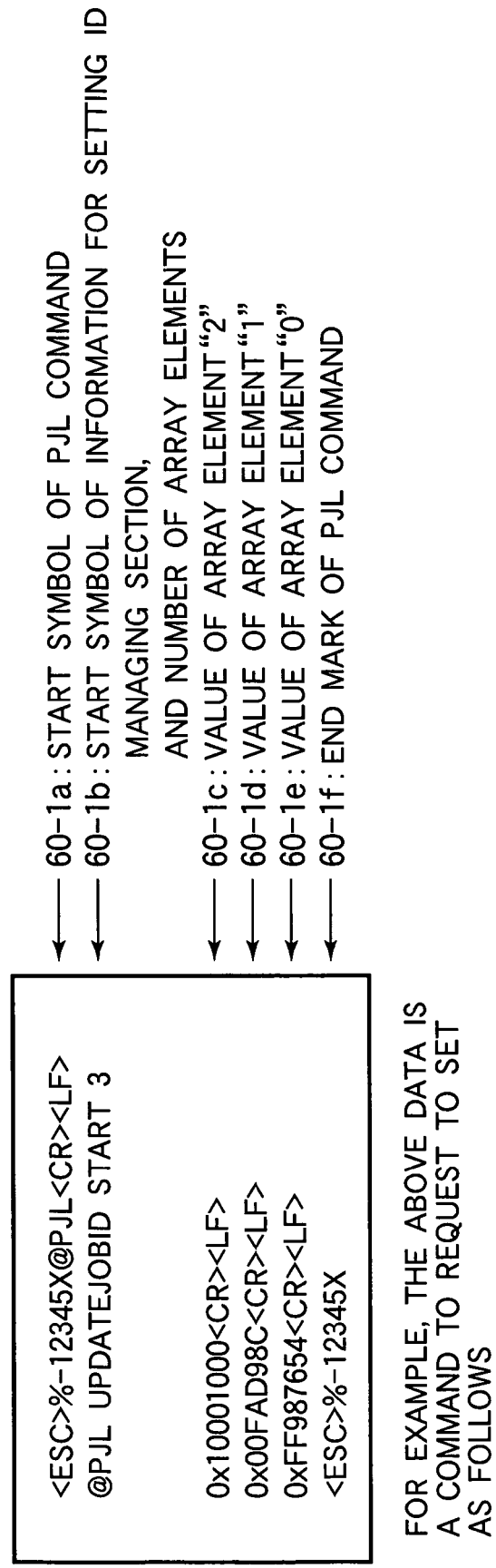
FIG. 21 illustrates the PJL command for setting the ID managing section.

FIG. 21 illustrates the PJL command for setting the ID information. Referring to FIG. 21, the PJL command includes a symbol 60-1a that indicates the start symbol of a PJL command, start symbol 60-1b that indicates the start of the information for setting the ID information and indicates the number of array elements, a value 60-1c that indicates an array element "2", a value 60-1d that indicates an array element "1", a value 60-1e that indicates an array element "0", and an end mark 60-1f that indicates the end of the PJL command.

Referring back to FIG. 19, the CPU 52 is a microprocessor that performs the overall control of the image forming apparatus 400.

The ROM 53 stores the program executed by the CPU 52 for performing the overall control of the image forming apparatus 400, and part of the control data.

{Operation of Image Forming Apparatus}

Figure 22:
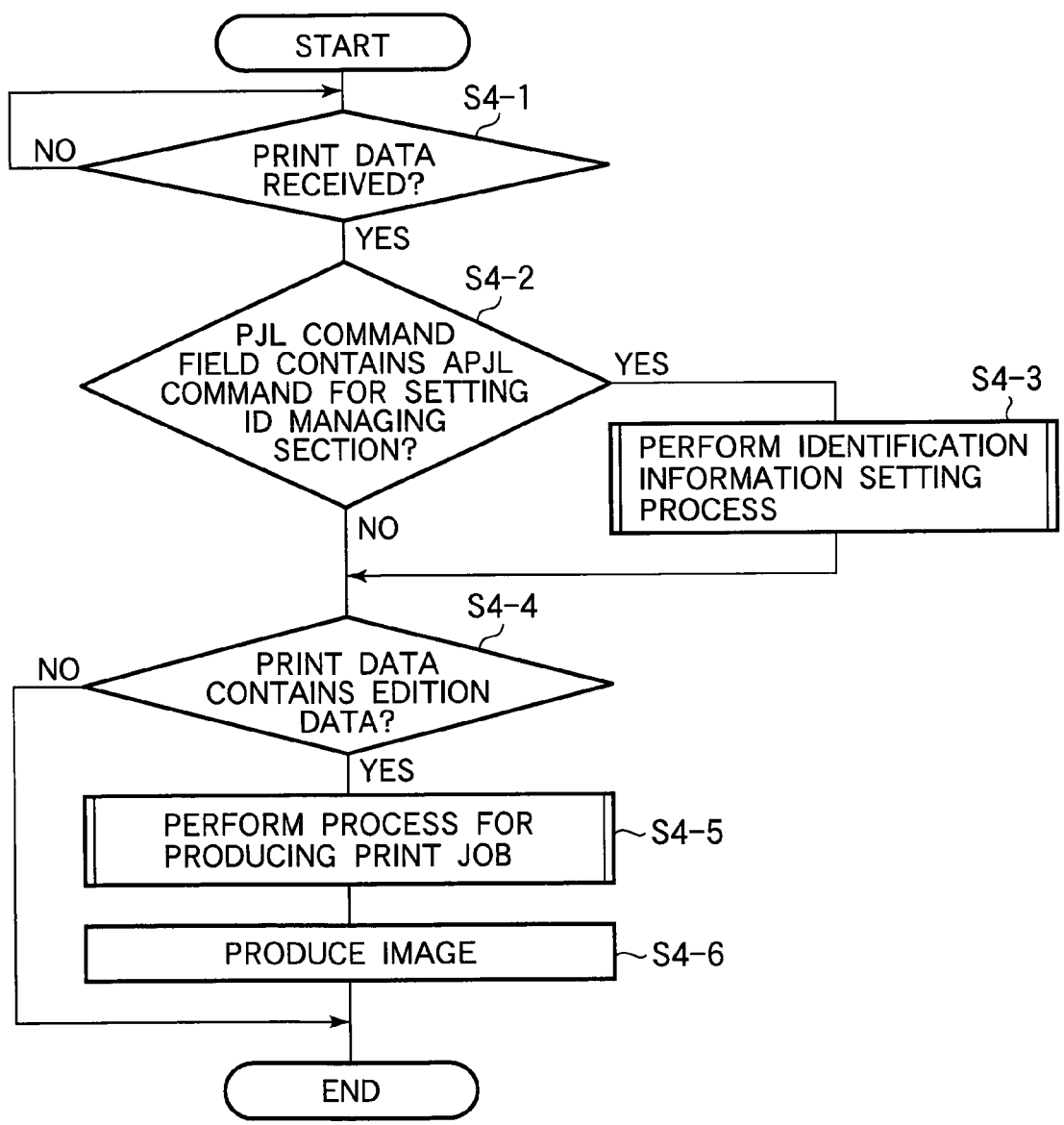
FIG. 22 is a flowchart illustrating the operation of the image forming apparatus when the image forming apparatus receives the print data.

FIG. 22 is a flowchart illustrating the operation of the image forming apparatus 400 when the image forming apparatus 400 receives the print data 60 (FIG. 20). The operation of the image forming apparatus 400 will be described with reference to FIG. 22.

Step S4-1: The interface 1 waits for the reception of the print data 60 from a host apparatus 400. When the interface receives the print data 60, the program proceeds to step S4-2.

Step S4-2: The image processing section 4 makes a decision to determine whether the print data 60 contains the PJL command description field 60-1 and whether the PJL command description field 60-1 contains a PJL command for setting the ID information. If the answer is YES, then the program proceeds to step S4-3. If the answer is NO, then the program proceeds to step S4-4.

Step S4-3: The ID setting section 51 performs an identification information setting process, which will be described later. Then, the program proceeds to step S4-4.

Step S4-4: The image processing section 4 makes a decision to determine whether the print data 60 contains the edition data 60-2. If the answer is YES, then the program proceeds to step S4-5. If the answer is NO, then the program ends.

Step S4-5: The image processing section 4 performs the process for producing a print job. In the process, the ID information producing section 42 produces the identification information for the print job, and stores the identification information into the ID number storing area 11-5.

Step S4-6: The image processing section 4 initiates analysis of the print job to generate bit map data or image data. Then, the image processing section 4 outputs the thus generated image data to the print engine. Then, the program ends.

Figure 23:
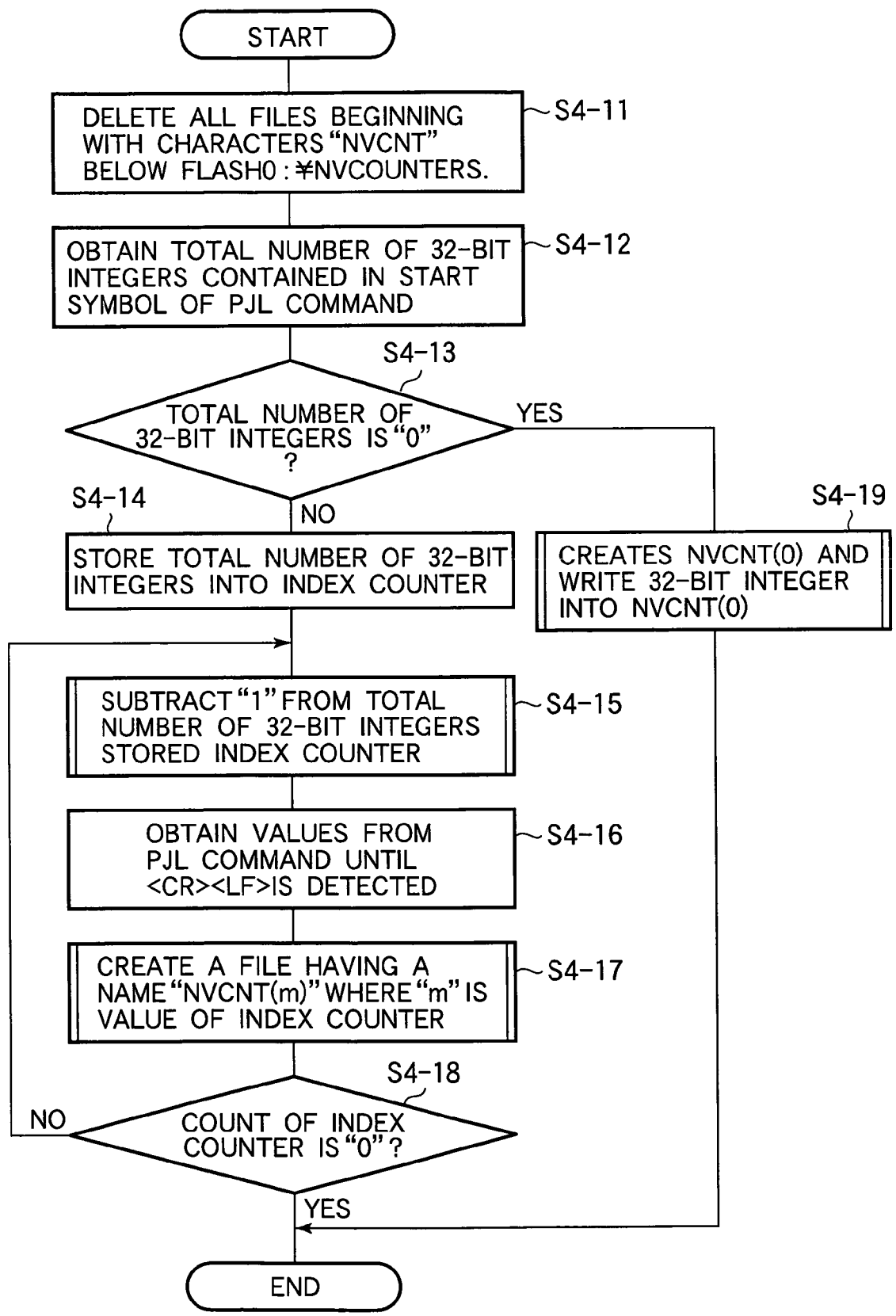
FIG. 23 is a flowchart illustrating the operation of the ID setting section.

FIG. 23 is a flowchart illustrating the operation of the ID setting section 51. The flowchart illustrates the operation performed at step S4-3 in FIG. 22 in more detail. It is assumed that the print data contains a PJL command for setting the ID information in FIG. 21.

Step S4-11: The ID setting section 51 deletes all the files beginning with the characters "NVCNT" beneath the FLASH0:øNVCOUNTERS.

Step S4-12: The ID setting section 51 obtains the total number of 32-bit integers from the PJL command for setting the ID information. This information is the start symbol 60-1b, and is "3" in FIG. 21. This indicates that the number of files (counters) to be set is "3."

Step S4-13: If the total number of 32-bit integers is "0", the program jumps to step S4-19. If the total number of 32-bit integers is not "0", the program proceeds to step S4-14. Since the total number of 32-bit integers is "3," the program proceeds to step S4-14.

Step S4-14: The ID setting section 51 stores the total number of 32-bit integers (here "3") into the index counter 51-1.

Step S4-15: The ID setting section 51 subtracts "1" from the total number of 32-bit integers stored in the index counter 51-1.

Step S4-16: The ID setting section 51 obtains the value 60-1c that indicates the array element "2". Specifically, the ID setting section 51 obtains a value until <CR><LF> is detected. This value corresponds to the value set in the NVCNT(2).

Step S4-17: The ID setting section 51 creates a file (counter) having a name NVCNT(m) where "m" is the value of the index counter, i.e., NVCNT(2). The value obtained at step S4-16 (here, "10001000") is stored into the file.

Step S4-18: The ID setting section 51 repeats the steps S4-15 to S4-17 until the count of the index counter 51-1 becomes "0". Then, the program ends. When the steps S4-15 to S4-17 are repeated, the value 60-1d that indicates the array element "1" and the value 60-1e that indicates the array element "0" are stored into the NVCNT(1) and NVCNT(0), respectively.

Step S4-19: The ID setting section 51 creates the NVCNT (0), and writes the 32-bit integer into the NVCNT(0).

In the fourth embodiment, the ID setting section 51 allows the administrator of the image forming apparatus 400 to update the value of the non-volatile counter 13-1, managed by the ID managing section 41, from outside of the image forming apparatus 400. This configuration allows the user to set predetermined values to the beginning of the identification information of print jobs, for example, on a week-to-week basis or on a month-to-month basis. This makes the management of print jobs easy.

While the present invention has been described with respect to an image forming apparatus (e.g., printer), the invention is not limited to image forming apparatuses and may also be applied to a composite computing system (e.g., personal computer).

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An information managing apparatus that assigns identification information to a plurality of items of print data and manages the plurality of items of print data based on the identification information, the information managing apparatus comprising:
   a receiving section that receives the plurality of items of print data;
   a first counter defined in a non-volatile first memory;
   a second counter defined in a volatile second memory;
   an identification information producing section that produces the identification information for identifying each of the plurality of items of print data based on a count of said first counter and a count of said second counter; and
   an identification information managing section that manages the plurality of items of print data based on the identification information;
   a size extending section that monitors the count of said first counter, the size extending section increasing said first counter in size when the count of said first counter overflows.

2. The information managing apparatus according to claim 1, wherein said second counter counts up by a value every time said receiving section receives an item of data, and said first counter counts up when the image forming apparatus is turned on, and when said second counter overflows.

3. The information managing apparatus according to claim 1, wherein said identification information producing section combines the count of said first counter and the count of said second counter for producing the identification information, the count of said first counter and the count of said second counter being combined such that the count of said first counter represents higher significant bits of the identification information and the count of said second counter represents lower significant bits of the identification information.

4. The information managing apparatus according to claim 1, wherein the second memory includes a memory area that stores the count read from said first counter;
   wherein said identification information producing section produces the identification information based on a count held in the memory area and the count of said second counter.

5. The information managing apparatus according to claim 1, wherein said first counter is defined in a hard disk drive, and wherein said size extending section increases said first counter in size in accordance with a file system in the hard disk drive.

6. The information managing apparatus according to claim 1, wherein the information is transmitted from an external device.

7. The information managing apparatus according to claim 1, wherein the information managing apparatus is a printer.

8. An information managing apparatus that assigns identification information to a plurality of items of print data and manages the plurality of items of print data based on the identification information, the information managing apparatus comprising:
   a receiving section that receives the plurality of items of print data;
   a first counter defined in a non-volatile first memory;
   a second counter defined in a volatile second memory;
   an identification information producing section that produces the identification information for identifying each of the plurality of items of print data based on a count of said first counter and a count of said second counter;
   an identification information managing section that manages the plurality of items of print data based on the identification information; and
   a counter setting section that allows a user to set a desired value to said first counter from outside of the information managing apparatus.

9. The information managing apparatus according to claim 8, wherein the desired value is received through an information inputting section provided in the information managing apparatus.

10. The information managing apparatus according to claim 8, wherein said second counter counts up by a value every time said receiving section receives an item of data, and said first counter counts up when the image forming apparatus is turned on, and when said second counter overflows.

11. The information managing apparatus according to claim 8, wherein said identification information producing section combines the count of said first counter and the count of said second counter for producing the identification information, the count of said first counter and the count of said second counter being combined such that the count of said first counter represents higher significant bits of the identification information and the count of said second counter represents lower significant bits of the identification information.

12. The information managing apparatus according to claim 8, wherein the second memory includes a memory area that stores the count read from said first counter;
   wherein said identification information producing section produces the identification information based on a count held in the memory area and the count of said second counter.

13. The information managing apparatus according to claim 8, wherein the information managing apparatus is a printer.

14. An information managing apparatus that assigns identification information to a plurality of items of print data and manages the plurality of items of print data based on the identification information, the information managing apparatus comprising:
   a receiving section that receives the plurality of items of print data;
   a first counter defined in a non-volatile first memory;
   a second counter defined in a volatile second memory;
   an identification information producing section that produces the identification information for identifying each of the plurality of items of print data based on a count of said first counter and a count of said second counter;
   an identification information managing section that manages the plurality of items of print data based on the identification information;
   an identification information storing section that detects identification information assigned to a first one of the plurality of items of print data that does not contain data to be printed, and stores the detected identification information therein; and an identification acquiring section that assigns the identification information stored in said identification information storing section to a second one of the plurality of items of print data that contains data to be printed.

15. The information managing apparatus according to claim 14, wherein the first one of the plurality of items of print data includes a status information storing area that stores a process status of the first one of the plurality of items of print data;

wherein said identification information storing section detects the first one of the plurality of items of print data based on the process status.

16. The information managing apparatus according to claim 14, wherein said second counter counts up by a value every time said receiving section receives an item of data, and said first counter counts up when the image forming apparatus is turned on, and when said second counter overflows.

17. The information managing apparatus according to claim 14, wherein said identification information producing section combines the count of said first counter and the count of said second counter for producing the identification information, the count of said first counter and the count of said second counter being combined such that the count of said first counter represents higher significant bits of the identification information and the count of said second counter represents lower significant bits of the identification information.

18. The information managing apparatus according to claim 14, wherein the second memory includes a memory area that stores the count read from said first counter;

wherein said identification information producing section produces the identification information based on a count held in the memory area and the count of said second counter.

19. The information managing apparatus according to claim 14, wherein the information managing apparatus is a printer.

* * * * *